US008826012B2

(12) United States Patent
Kuroyanagi et al.

(10) Patent No.: US 8,826,012 B2
(45) Date of Patent: Sep. 2, 2014

(54) COMMUNICATION APPARATUS, CONTROL METHOD THEREOF, AND PROGRAM

(75) Inventors: Tomohiro Kuroyanagi, Kanagawa (JP); Motoyuki Katsumata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1229 days.

(21) Appl. No.: 11/625,018

(22) Filed: Jan. 19, 2007

(65) Prior Publication Data

US 2007/0180236 A1 Aug. 2, 2007

(30) Foreign Application Priority Data

Jan. 31, 2006 (JP) ................. 2006-022322

(51) Int. Cl.
*H04N 1/44* (2006.01)
*H04L 29/06* (2006.01)
*H04L 12/58* (2006.01)

(52) U.S. Cl.
CPC ............. *H04L 63/0428* (2013.01); *H04L 12/58* (2013.01); *H04N 2201/3222* (2013.01)
USPC .......................................... 713/162; 380/243

(58) Field of Classification Search
CPC ............... H04L 63/0428; H04L 12/58; H04N 2201/3222
USPC .......................................... 713/162; 380/243
See application file for complete search history.

(56) References Cited

U.S. PATENT DOCUMENTS

| 5,455,864 | A | * | 10/1995 | Park ............................... 380/43 |
| 5,513,126 | A | * | 4/1996 | Harkins et al. ................. 709/228 |
| 6,178,244 | B1 | | 1/2001 | Takeda et al. |
| 6,732,101 | B1 | * | 5/2004 | Cook .................................... 1/1 |
| 6,990,578 | B1 | * | 1/2006 | O'Brien et al. ................ 713/156 |
| 2002/0108034 | A1 | * | 8/2002 | Hashem et al. ............... 713/153 |
| 2004/0039797 | A1 | * | 2/2004 | Simpson et al. .............. 709/219 |

(Continued)

FOREIGN PATENT DOCUMENTS

| JP | 9-252294 | 9/1997 |
| JP | 2001-92608 | 4/2001 |

(Continued)

OTHER PUBLICATIONS

Schneier, Bruce. Applied Cryptography, 1996 John Wiley & Sons, Inc., pp. 32-33.*

(Continued)

*Primary Examiner* — Michael Simitoski
(74) *Attorney, Agent, or Firm* — Oblon, Spivak, McClelland, Maier & Neustadt, L.L.P.

(57) ABSTRACT

A communication apparatus transmits data to a plurality of destinations. The apparatus includes a first input unit that inputs an individual setting as to whether the data is encrypted for each of the plurality of destinations for an encryption transmission. The apparatus also includes a second input unit that inputs an individual setting as to whether the data is encrypted for each transmission job. Further, the apparatus includes a transmission control unit that, when the transmission job includes at least two sets of the destinations, if the transmission job is set to be encrypted, performs the encryption transmission for each of the destinations, and, if the transmission job is set to be not encrypted, performs the encryption transmission for each of the destinations to be encrypted and performs a transmission without an encryption for each of the destinations not to be encrypted.

8 Claims, 26 Drawing Sheets

(56) References Cited

U.S. PATENT DOCUMENTS

| | | | |
|---|---|---|---|
| 2005/0010801 A1* | 1/2005 | Spies et al. .................... | 713/200 |
| 2005/0160292 A1* | 7/2005 | Batthish et al. ............... | 713/201 |
| 2005/0228864 A1* | 10/2005 | Robertson .................... | 709/206 |
| 2005/0267939 A1* | 12/2005 | Davidson et al. ............. | 709/206 |
| 2006/0256392 A1* | 11/2006 | Van Hoof et al. ............. | 358/402 |
| 2007/0028097 A1* | 2/2007 | Masui et al. .................. | 713/156 |

FOREIGN PATENT DOCUMENTS

| | | |
|---|---|---|
| JP | 2002-368823 | 12/2002 |
| JP | 2003-134296 | 5/2003 |
| JP | 2005-157770 | 6/2005 |

OTHER PUBLICATIONS

Wells Fargo Authentication Services (WFAS). "Secure Email User Guide—Outlook 2000", May 2003.*

Japanese Office Action issued Jul. 5, 2011, in Patent Application No. 2006-022322.

Yukiko Nagae, et al., "A Construction of Automatic Cryptograph Server for Mail (2)", IPSJ SIG Technical Report, Information Processing Society of Japan, Mar. 5, 1999, vol. 99, No. 24, pp. 61-66 (with Partial English translation).

* cited by examiner

FIG.4A

| MAIL DESTINATION (100 ENTRIES) |
| --- |
| FAX DESTINATION (100 ENTRIES) |
| GROUP DESTINATION (100 ENTRIES) |
| FILE DESTINATION (100 ENTRIES) |

(ADDRESS BOOK INFORMATION)

FIG.4B

| NAME |
| --- |
| E-MAIL ADDRESS |
| POSITION |
| ENCRYPTION FLAG (ENCRYPT/ NOT ENCRYPT) |
| PUBLIC KEY A |

(MAIL DESTINATION)

FIG.4C

| NAME |
| --- |
| FAX NUMBER |
| LOCATION |
| ENCRYPTION FLAG (ENCRYPT/ NOT ENCRYPT) |
| PUBLIC KEY B |

(FAX DESTINATION)

FIG.4D

| NAME |
| --- |
| E-MAIL DESTINATION #1 |
| ... |
| E-MAIL DESTINATION #M |

(GROUP DESTINATION)

FIG.4E

| NAME |
| --- |
| NETWORK PATH |
| LOGIN USER NAME |
| LOGIN PASSWORD |
| ENCRYPTION FLAG (ENCRYPT/ NOT ENCRYPT) |

(FILE DESTINATION)

(COMMUNICATION HISTORY INFORMATION)

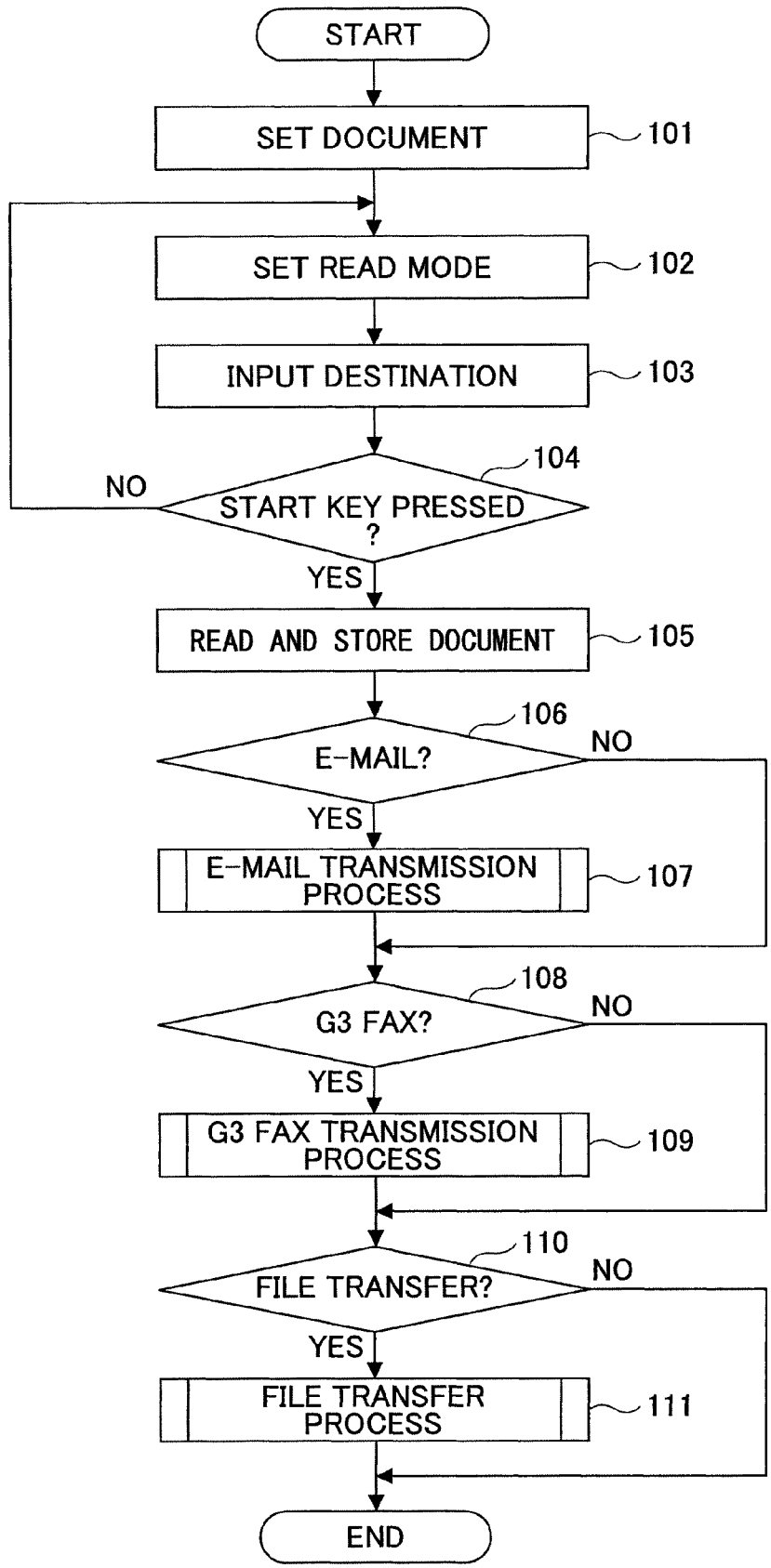

COMMUNICATION APPARATUS, CONTROL METHOD THEREOF, AND PROGRAM

BACKGROUND OF THE INVENTION

1. Field of the Invention

The present invention relates to a communication apparatus that is capable of transmitting information using plural transmission methods, a method of controlling such an apparatus, and a program for enabling a computer to execute such a method.

2. Description of the Related Art

An image processing apparatus such as a network-connected multifunction machine that has communication functions may be configured to transmit the same set of image data to plural destinations, for example. In such an apparatus, the destination designation operations for designating the plural destinations with respect to a transmission job (transmission process) may be completed in one operation sequence, for example.

In recent years and continuing, security is becoming an important issue in the field of communications. For example, an image registration server that registers and distributes images registered in client terminal apparatuses may have means for registering an encryption key of each transmission terminal and means for encrypting an image using its registered encryption key to transmit the image. The terminal receiving such an image may use a dedicated decryption key to decrypt the received image. In this way, security measures may be implemented against interception of data communications, eavesdropping, data access under false identity, and data tampering, for example (e.g., see Japanese Laid-Open Patent Publication No. 2001-092608).

In the case of designating transmission destinations in conventional imaging apparatuses, when a destination requiring transmission of an encrypted image is selected, it may not be possible to simultaneously select another destination that does not require such encryption transmission, or even if selection of such a destination is possible, actual image transmission to the selected destination may be not be possible, for example. Similarly, when a destination that does not require transmission of an encrypted image is selected, another destination that requires transmission of an encrypted image may not be selected, or such transmission may not be enabled.

Accordingly, when a user wishes to transmit an image to a destination that requires encrypted image transmission and another destination that does not require encrypted image transmission such as a destination within a LAN that does not involve transmission via an external network, the user may have to perform the same designation operations two times which can be quite burdensome.

SUMMARY OF THE INVENTION

Embodiments of the present invention solve one or more of the above problems by providing a communication apparatus that is capable of reducing the burden of the user in designation operations associated with data transmission, a method for controlling such an apparatus, and a program enabling a computer to execute such a method. According to one aspect of the present invention, a destination that requires encryption transmission and a destination that does not require encryption transmission may be selected at once in one designation operation sequence for one transmission job to be transmitted simultaneously so that the burdens imposed on the user in performing transmission operations may be reduced.

According to one embodiment of the present invention, a communication apparatus is provided that transmits data using a plurality of transmission methods, the apparatus including:

a transmission information input unit that inputs transmission information including destination information and encryption information; and an encryption unit that generates encrypted data based on the encryption information;

wherein when at least two sets of the destination information are input for a transmission job, an encryption determination process is performed on each set of destination information to determine whether encryption transmission involving transmission of the encrypted data is to be performed.

In one preferred embodiment, the communication apparatus of the above embodiment may further include:

a forced encryption setting information storing unit that stores forced encryption setting information for each set of the destination information, the forced encryption setting information indicating whether the encryption transmission is to be performed; and a transmission job encryption setting unit that sets job encryption information indicating whether the encryption transmission is to be performed for the transmission job;

wherein the encryption determination process is performed on each set of the destination information based on the job encryption information and the forced encryption setting information.

In another preferred embodiment of the present invention, when at least one set of destination information pertaining to a first type destination that requires the encryption transmission and at least one set of destination information pertaining to a second type destination that does not require the encryption transmission are input for the transmission job, a user guidance message is output indicating that the destination information pertaining to the first type destination and the destination information pertaining to the second type destination have been input; and when a command to continue the transmission job is input in response to the user guidance message, the encryption transmission is performed for the first type destination, and normal transmission is performed for the second type destination.

In another preferred embodiment of the present invention, when at least one set of destination information pertaining to a first type destination that requires the encryption transmission and at least one set of destination information pertaining to a second type destination that does not require the encryption transmission are input for the transmission job; and when the job encryption information indicates that the encryption transmission does not have to be performed for the transmission job;

the encryption transmission is performed for the first type destination.

In another preferred embodiment of the present invention, when at least one set of destination information pertaining to a first type destination that requires the encryption transmission is input, an encryption process is performed on the at least one set of destination information pertaining to the first type destination; and when the encryption process ends in failure, transmission operations of the transmission job are not performed.

In another preferred embodiment of the present invention, when at least one set of destination information pertaining to a first type destination that requires the encryption transmission and at least one set of destination information pertaining to a second type destination that does not require the encryption transmission are input, an encryption process is performed on the at least one set of destination information pertaining to the first type destination; and when the encryption process ends in failure, transmission operations of the transmission job that are directed to the second type destination are performed.

In another preferred embodiment of the present invention, when a first set of destination information pertaining to a destination requiring the encryption transmission is input, an encryption process is performed on the first set of destination information; and when the encryption process ends in failure, transmission operations of the transmission job that are associated with the first set of destination information are not performed and transmission operations of the transmission job that are associated with the sets of destination information other than the first set of destination information are performed.

According to another embodiment of the present invention, a method is provided for controlling a communication apparatus that transmits data using a plurality of transmission methods, the method including the steps of:

inputting at least two sets of destination information for one transmission job; and determining whether encryption transmission is to be performed for each set of the destination information.

According to a preferred embodiment, the method of the above embodiment may further include the steps of:

storing forced encryption setting information for each set of the destination information, the forced encryption setting information indicating whether the encryption transmission is to be performed;

setting job encryption information indicating whether the encryption transmission is to be performed for the transmission job; and determining whether to perform the encryption transmission for each set of the destination information based on the forced encryption setting information and the job encryption information.

According to another embodiment of the present invention, a computer-readable program is provided that is run on a computer installed in a communication apparatus that transmits data using a plurality of transmission methods, the program being executed by the computer to perform the steps of:

storing forced encryption setting information indicating whether to perform encryption transmission for a plurality of sets of destination information;

setting job encryption information indicating whether to perform encryption transmission for the transmission job;

inputting at least two of the sets of destination information as designated destinations for the transmission job; and determining whether to perform the encryption transmission for each of the designated destinations based on the forced encryption setting information and the job encryption information;

wherein when at least one set of destination information pertaining to a first type destination and at least one set of destination information pertaining to a second type destination are input as the designated destinations for the transmission job, a user guidance message is output indicating that the designated destinations include the first type destination and the second type destination; and when a command to continue the transmission job is issued in response to the user guidance message, the encryption transmission is performed for the first type destination and normal transmission is performed for the second type destination.

BRIEF DESCRIPTION OF THE DRAWINGS

FIGS. 4A-4E are tables illustrating exemplary contents of address book information;

FIG. 11 is a flowchart illustrating a transmission process according to one example;

DESCRIPTION OF THE PREFERRED EMBODIMENTS

In the following, preferred embodiments of the present invention are described with reference to the accompanying drawings.

Figure 1:
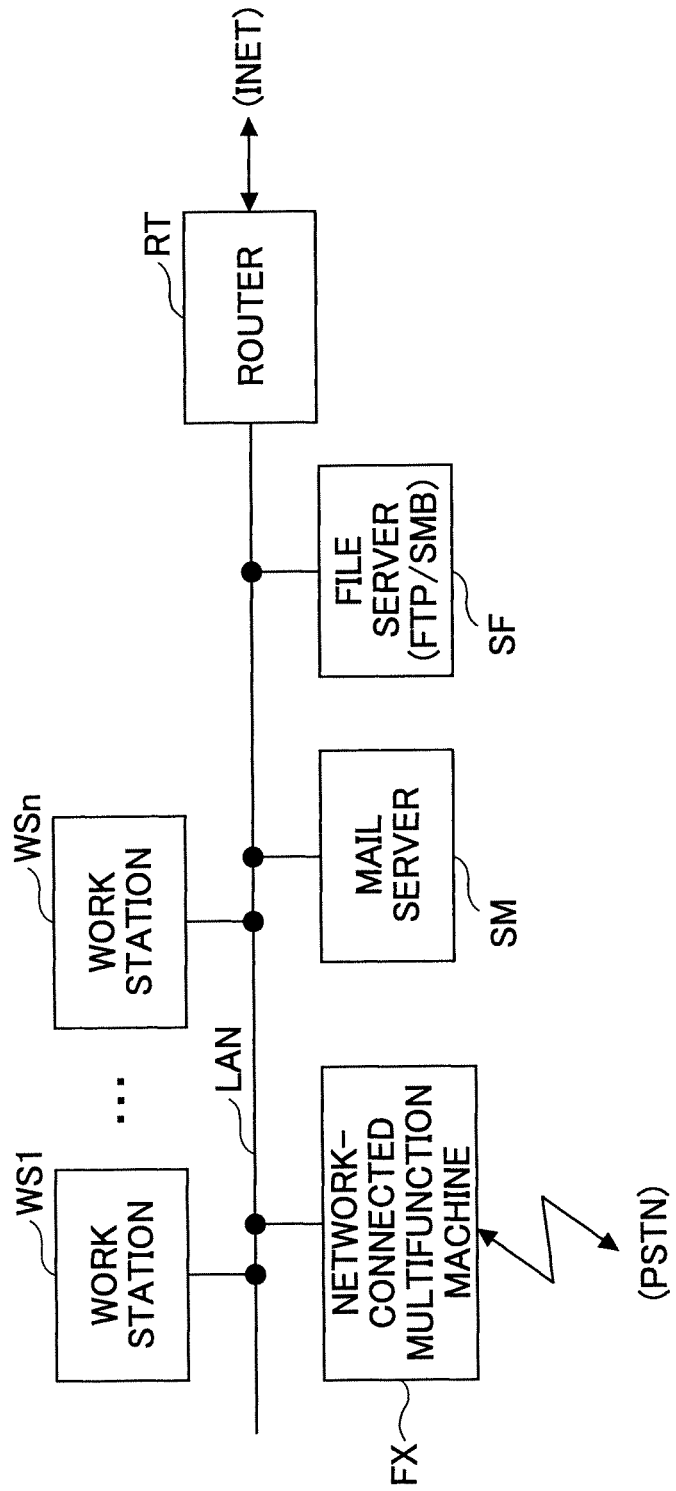
FIG. 1 is a block diagram showing an exemplary configuration of a network system according to an embodiment of the present invention.

FIG. 1 is a block diagram showing a configuration of a network system according to an embodiment of the present invention.

In this drawing, plural workstations WS1-WSn, a mail server SM, a file server SF, and a network-connected multifunction machine FX are connected to a local area network (LAN). The above apparatuses are also connected to the Internet via a router RT so that the workstations WS1-WSn, the mail server SM, the file server SF, and the network-connected multifunction machine FX may exchange data with other external terminals via the Internet.

In the present embodiment, the mail server SM provides public electronic mail gathering/distributing services to users of the workstations WS1-WSn and the network-connected multifunction machine FX.

The file server SF uses the FTP (File Transfer Protocol) or SMB (Server Message Block) to provide file transmission/reception/storage services to users of the workstations WS1-WSn and the network-connected multifunction machine FX.

The workstations WS1-WSn are each used by specific users and have various programs installed therein such as an image processing program (image depiction program), a web browser, and e-mail client software. It is noted that each of the workstations WS1-WSn may be used by one specific user or plural specific users.

The network-connected multifunction machine FX as a communication apparatus according to one embodiment of the present invention has plural transmission functions including an e-mail processing function for exchanging image information and report information in the form of e-mail messages, a fax communication function for establishing connection with an analog public network PSTN and transmitting image information according to the group 3 fax transmission scheme using the public network PSTN as a transmission path, a scan-to-e-mail function for transmitting read image data via e-mail, and a file transfer function such as the FTP or the SMB for transferring read image data to the file server SF for storage, for example. The network-connected multifunction machine FX may also have an encryption communication function for encrypting transmission data, for example.

Figure 2:
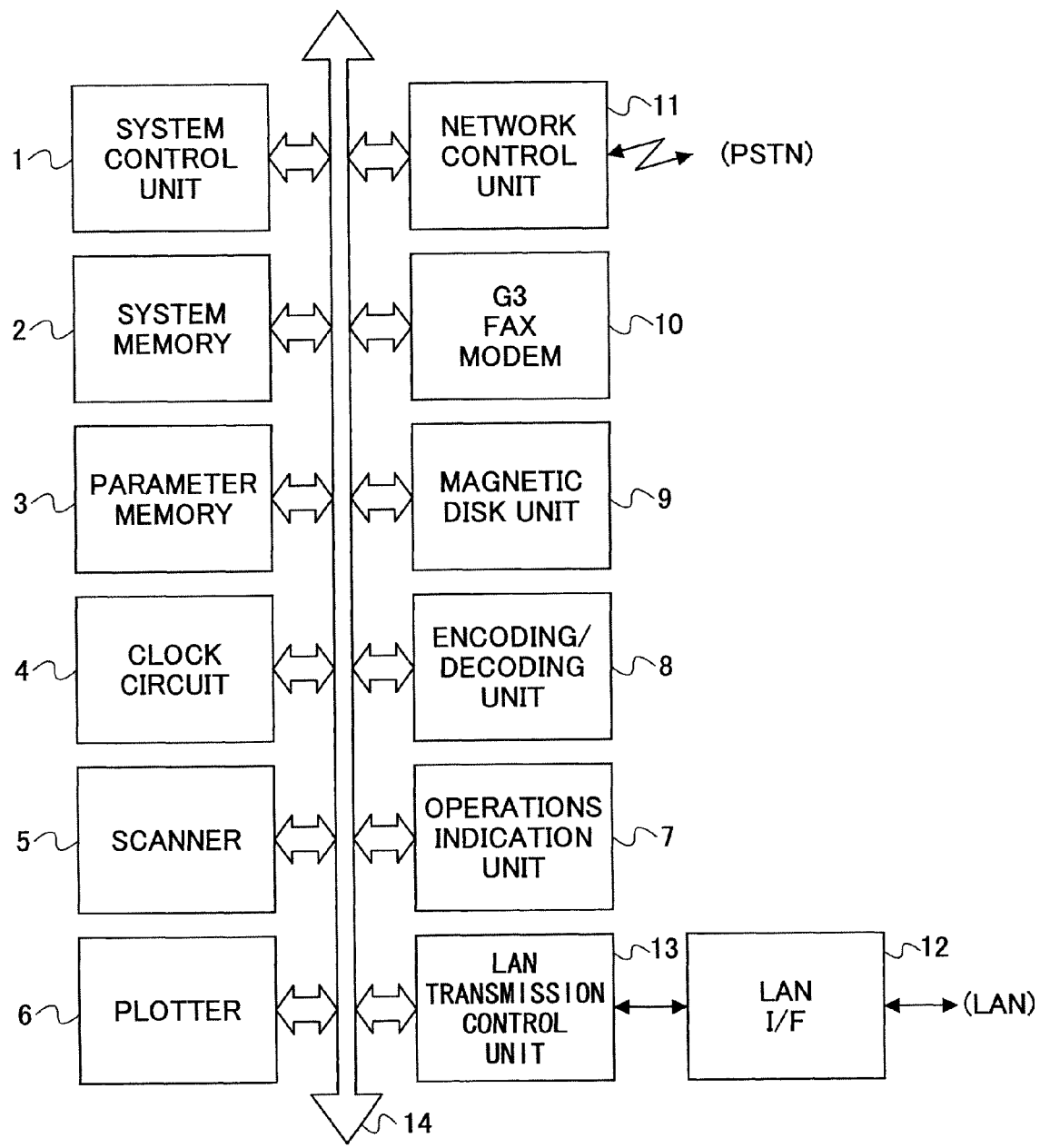
FIG. 2 is a block diagram showing an exemplary configuration of a network-connected multifunction machine of the network system shown in FIG. 1.

FIG. 2 is a block diagram showing an exemplary configuration of the network-connected multifunction machine FX.

The illustrated network-connected multifunction machine FX includes a system control unit 1 that performs various control processes including control processes for controlling overall operations of the present network-connected multifunction machine FX, encryption control processes, and transmission control processes; a system memory 2 that functions as a working area for the system control unit 1 and stores the control process programs to be executed by the system control unit 1 and data for enabling execution of the control process programs; a parameter memory 3 that stores information unique to the present network-connected multifunction machine FX; and a clock circuit 4 that outputs current time information.

The network-connected multifunction machine FX also includes a scanner 5 that reads a document image at a predetermined resolution; a plotter 6 that records/outputs an image at a predetermined resolution; and an operations indication unit 7 including operation keys and indication devices for enabling operation of the present network-connected multifunction machine FX.

The network-connected multifunction machine FX also includes an encoding/decoding unit 8 for compressing an image signal into compressed image information and decompressing the compressed image information back to the original image signal; and a magnetic disk unit 9 that stores plural sets of compressed image information and other types of data files, for example.

The network-connected multifunction machine FX also includes a group 3 fax modem 10 that embody group 3 modem functions including a low-speed modem function (e.g., V. 21 modem) for exchanging transmission procedure signals and a high-speed modem function (e.g., V. 17 modem, V. 34 modem, V. 29 modem, or V. 27 tar modem) primarily for exchanging image information, for example.

A network control unit 11 connects the network-connected multifunction machine FX to the analog public network PSTN and has an automatic call transmission/reception function.

A local area network interface circuit 12 connects the network-connected multifunction machine FX to the LAN, and a local area network transmission control unit 13 performs communication control processes for controlling communication of protocol suites to enable data exchange between other data terminal apparatuses connected to the LAN.

The system control unit 1, the system memory 2, the parameter memory 3, the clock circuit 4, the scanner 5, the plotter 6, the operations indication unit 7, the encoding/decoding unit 8, the magnetic disk unit 9, the group 3 fax modem 10, the network control unit 11, and the local area network transmission control unit 13 are interconnected by an internal bus 14, and data exchange between these units are performed primarily via the internal bus 14.

It is noted that data may be directly exchanged between the network control unit 11 and the group 3 fax modem 10.

Also, it is noted that the operations indication unit 7 may embody a transmission information input unit of a communication apparatus according to an embodiment of the present invention, and the system control unit 1 and the system memory 2 may embody an encryption unit, a forced encryption setting information storing unit, and a job encryption information setting unit according to an embodiment of the present invention.

Figure 3:
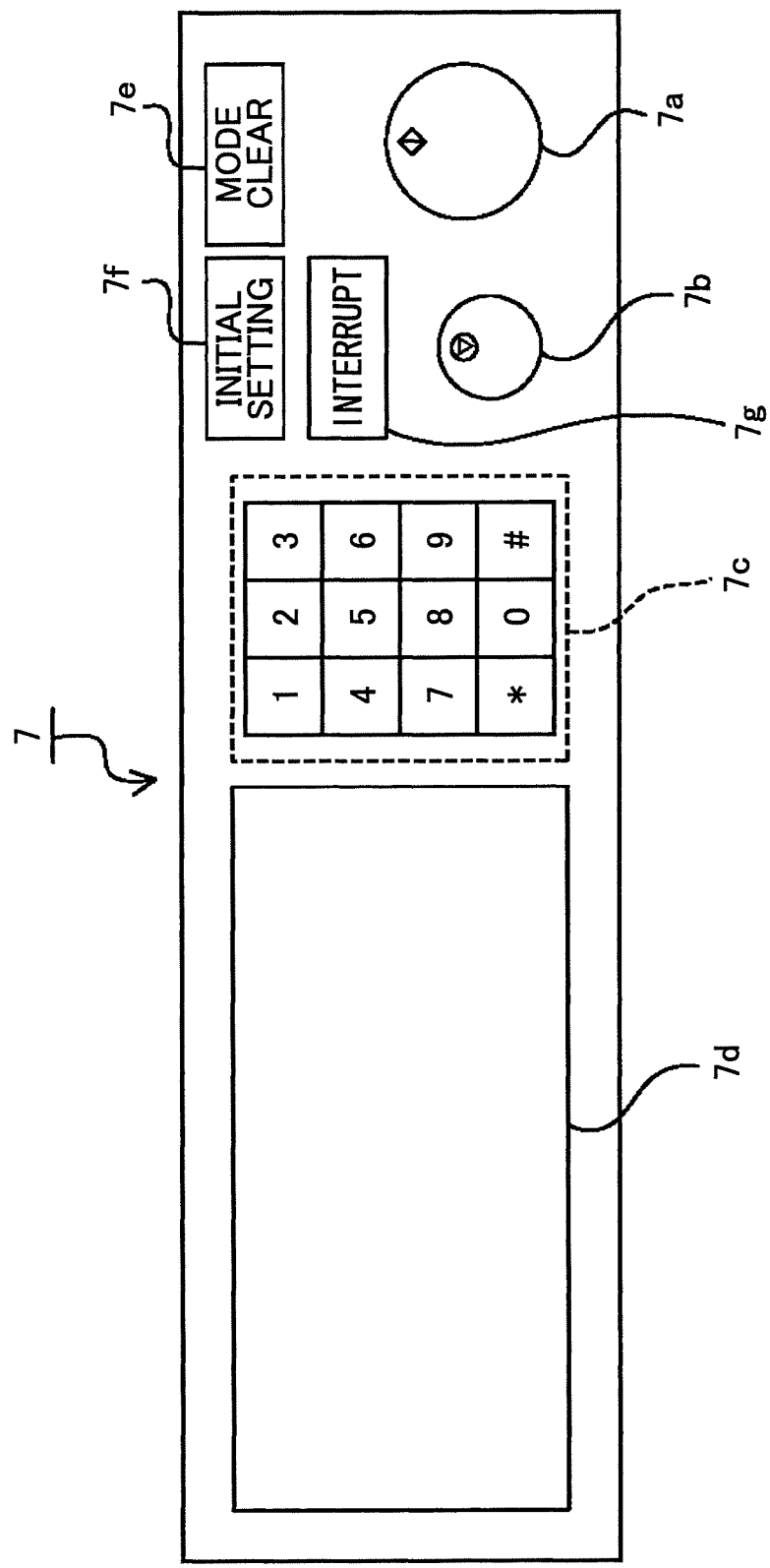
FIG. 3 is a diagram showing an exemplary configuration of an operations indication unit of the network-connected multifunction machine.

FIG. 3 is a diagram showing an exemplary configuration of the operations indication unit 7.

In this example, the operations indication unit 7 includes a start key 7a for inputting a start command for starting transmission/reception operations of the network-connected multifunction machine FX, a stop key 7b for inputting a stop command for stopping operations of the network-connected multifunction machine FX, ten keys 7c for inputting number (numerical value) information such as a phone/fax number.

The operations indication unit 7 also includes a liquid crystal touch panel unit 7d that is displayed on a display screen of a liquid crystal display unit. The touch panel unit 7d enables operations through touching appropriate areas of the display screen, and functions as a user interface of the network-connected multifunction machine FX.

The operations indication unit 7 also includes a mode clear key 7e for clearing operation modes, an initial setting key 7f for inputting an initial setting start command, and an interruption key 7g for inputting an interruption command.

According to one embodiment, the network-connected multifunction machine FX includes address book information that registers destination information on transmission destinations to which a transmission process of the network-connected multifunction machine FX may be directed. For example, the network-connected multifunction machine FX may include address book information as is shown in FIG. 4A.

The address book information of FIG. 4A includes 100 entries of e-mail destinations that may be referenced upon establishing e-mail communication, 100 entries of fax destinations that may be referenced upon establishing group 3 fax communication, 100 entries of group destinations that may be referenced upon establishing e-mail communication, and 100 entries of file transfer destinations that may be referenced upon establishing file transfer communication.

As is shown in FIG. 4B, for example, one entry of e-mail destination information may include information items such as an e-mail destination name, an e-mail address, the position of a corresponding registered user of the e-mail destination, an encryption flag for indicating whether information transmitted to the present destination should always be encrypted (forced encryption setting information), and a public key A used for encryption communication.

As is shown in FIG. 4C, for example, one entry of fax destination information may include information items such as a fax destination name, a fax number (or telephone number), the location of the registered fax destination, an encryption flag for indicating whether information transmitted to the present destination should always be encrypted (forced encryption setting information), and a public key B used for encryption communication.

As is shown in FIG. 4D, for example, one entry of group destination information may include names of more than one e-mail destinations.

As is shown in FIG. 4E, for example, one entry of file destination information may include information items such as a file destination name, a network path describing a transfer destination directory, a login user name and password used for logging into the file server SF, and an encryption flag for indicating whether encryption communication should be performed upon transmitting information to the present file destination.

Figure 5:
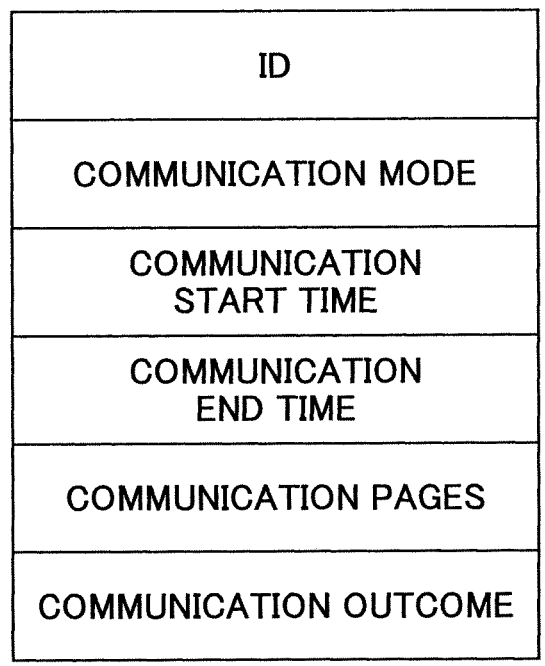
FIG. 5 is a table showing exemplary contents of communication history information.

According to one embodiment, the network-connected multifunction machine FX may generate and store communication history information as is shown in FIG. 5 for each sequence of communication operations (reception operations and transmission operations).

The communication history information may include information items such as an ID for distinguishing each individual set of communication history information, a corresponding communication mode such as communication type (e.g., e-mail transmission/reception, fax transmission/reception, file transfer) and encryption requirement of the relevant communication history information, the communication start time, the communication end time, communication pages, and the communication outcome.

In the following, examples of encryption communication are described.

Figure 6:
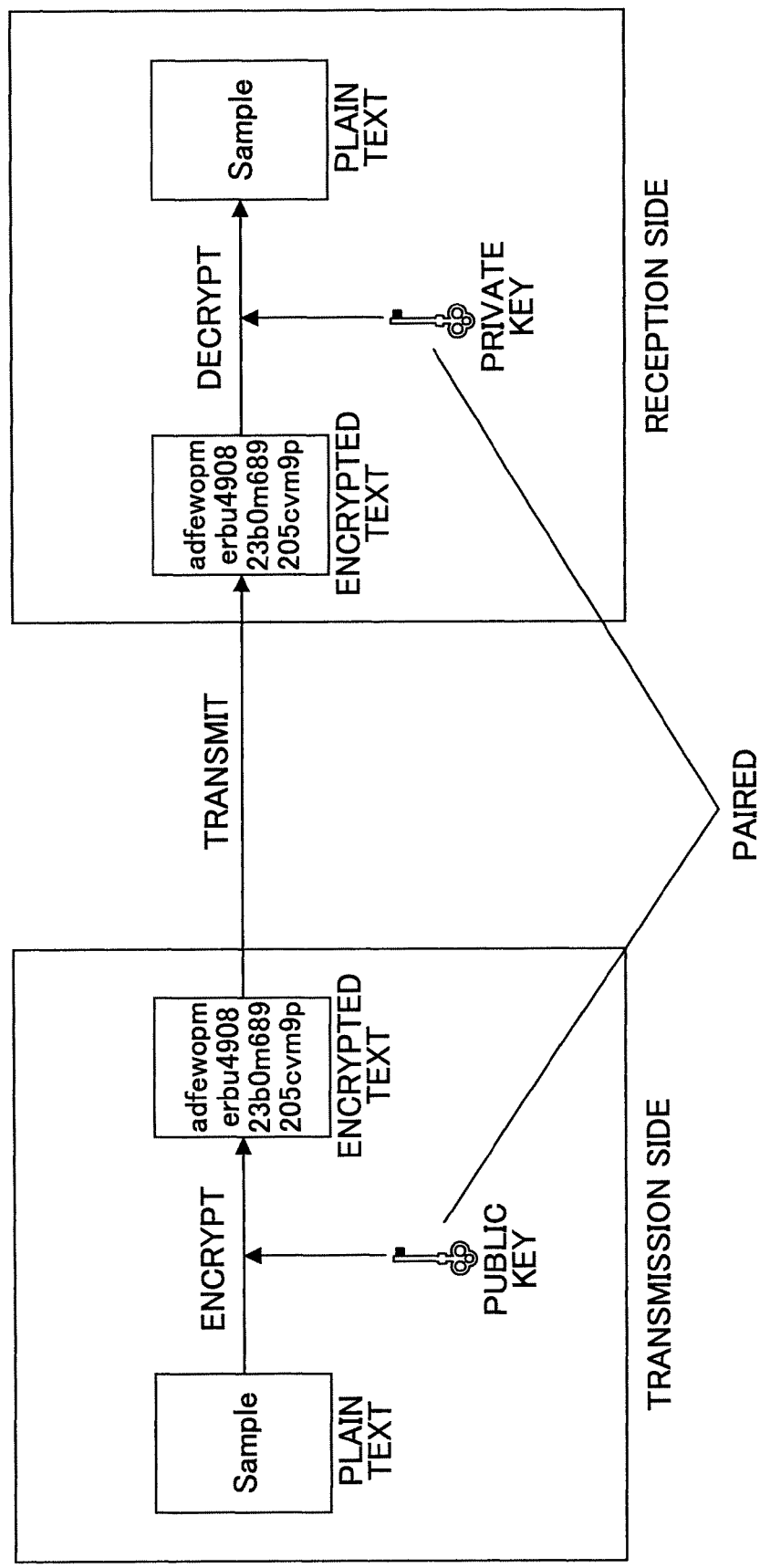
FIG. 6 is a diagram illustrating RSA encryption used for G3 fax transmission.

In group 3 fax transmission, encryption communication according to the ITU-T standard JT-T30 may be implemented. In this case, the encryption communication may conform to the RSA encryption scheme. Specifically, as is shown in FIG. 6, the transmission side encrypts a communication message (plain text) into encrypted text using a public key acquired from the reception side, and the reception side receives the encrypted text and decodes the received encrypted text using a private key corresponding to the public key used by the transmission side to restore the encrypted text back into the original plain text (communication message).

In this case, the public key B registered in the fax destination information may correspond to a public key transmitted from the reception side. In one embodiment, the public key may be registered manually by the operator of the network-connected multifunction machine FX, or alternatively, the network-connected multifunction machine FX may be configured to register the public key automatically by performing predetermined communication processes. For example, the public key may be automatically registered through e-mail, and when heightened security is desired, S/MIME (Secure Multipurpose Internet Mail Extensions) may be used.

In e-mail communication, S/MIME encryption may be used, for example. It is noted that encryption communication using S/MIME conforms to RFC 2311 (S/MIME Version 2 Message Specification) and RFC 2315 (PKCS #7: Cryptographic Message Syntax Version 1.5) issued by IETF.

Figure 7:
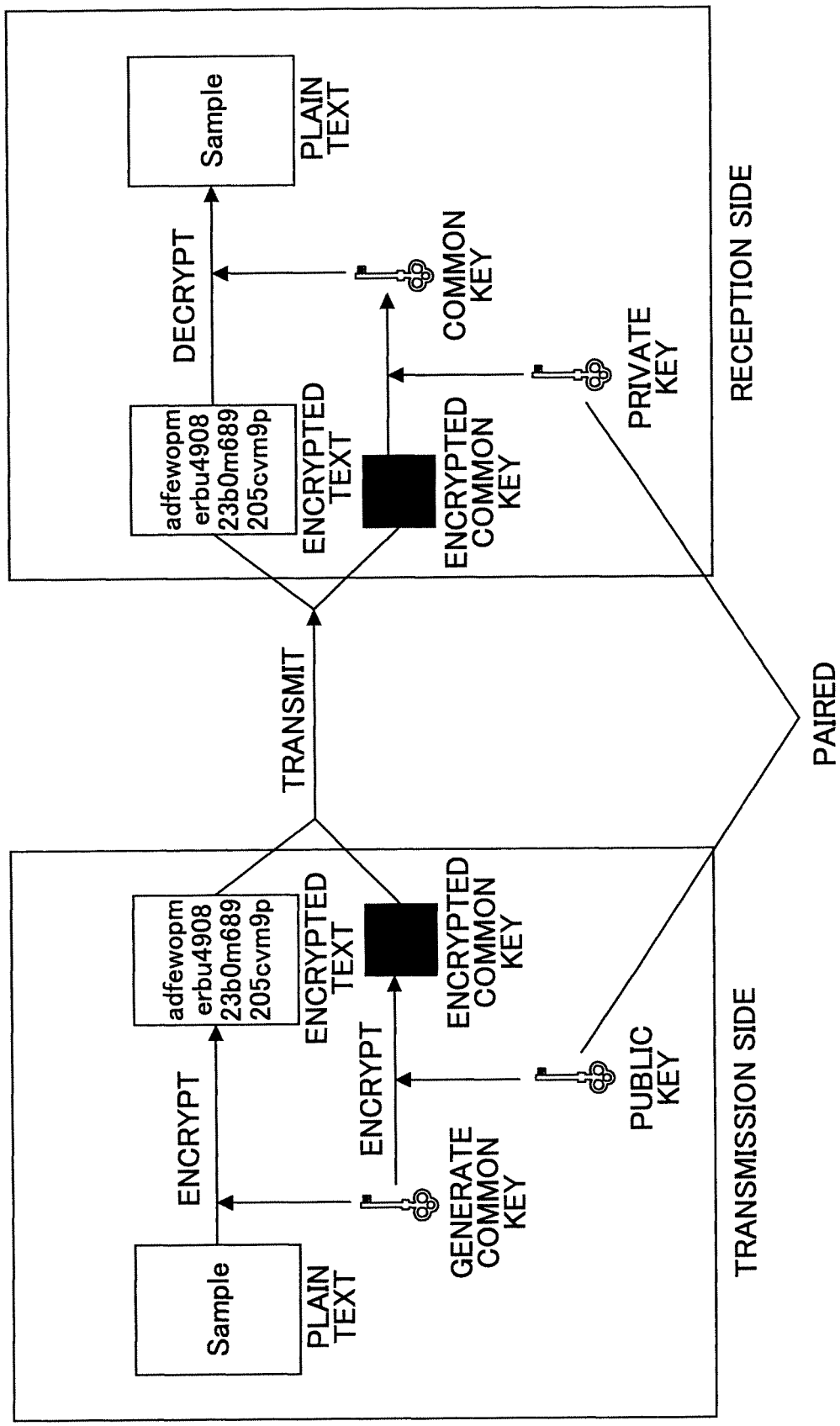
FIG. 7 is a diagram illustrating S/MIME encryption used for e-mail transmission.

As is shown in FIG. 7, in S/MIME encryption communication, the transmission side generates a common key and encrypts a communication message into encrypted text. The generated common key is encrypted by a public key transmitted from the reception side. The encrypted text and the encrypted common key are then transmitted to the reception side.

At the reception side, the encrypted common key is received and decoded using a private key corresponding to the public key used to encrypt the common key to generate the common key, and the generated common key is used to decode the encrypted text to thereby obtain the original communication message.

Figure 8:
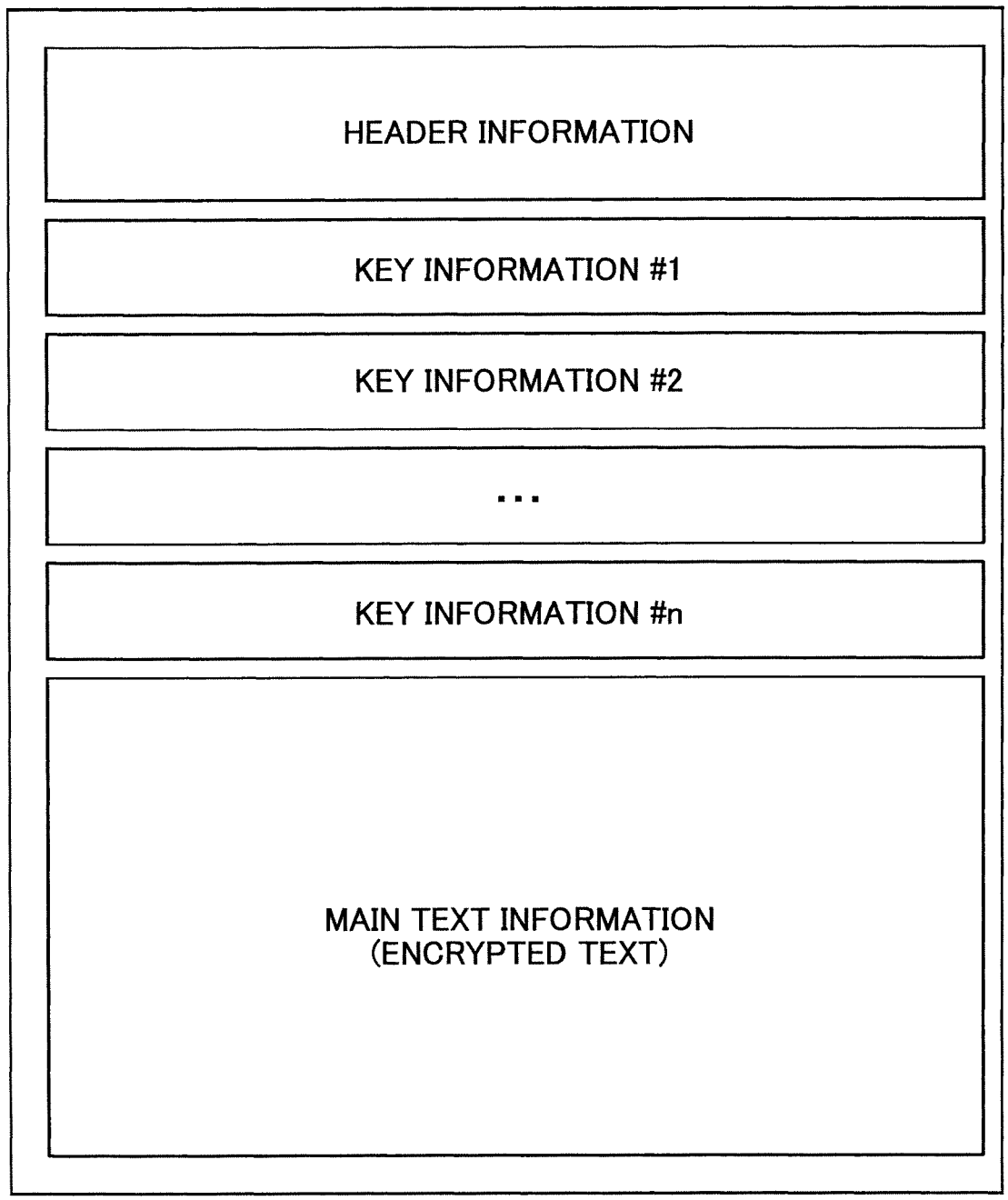
FIG. 8 is a diagram showing an example of a S/MIME e-mail message.

As is shown in FIG. 8, an e-mail message that is encrypted according to the S/MIME encryption scheme includes header information with at least one set of destination information ("To:" field), at least one set of encrypted key information corresponding to the destination information included in the header information (including an identifier assigned to the receiver), and encrypted text as main text information.

Upon receiving the e-mail, the e-mail receiving side searches for corresponding key information based on the identifier included in the encrypted key information of the received e-mail to decrypt the encrypted key information with a private key and obtain a common key. Then, the receiving side uses the common key to decrypt the encrypted main text into plain text.

In the case of performing file transfer using FTP, for example, encryption is realized using the SSL (Security Socket Layer). In this case, the message being exchanged remains unencrypted (i.e., in plain text), and the message stored in the file server SF may be in plain text.

In the case of using SMB, operations related to encryption may merely include the use of an encryption password upon logging in.

Figure 9:
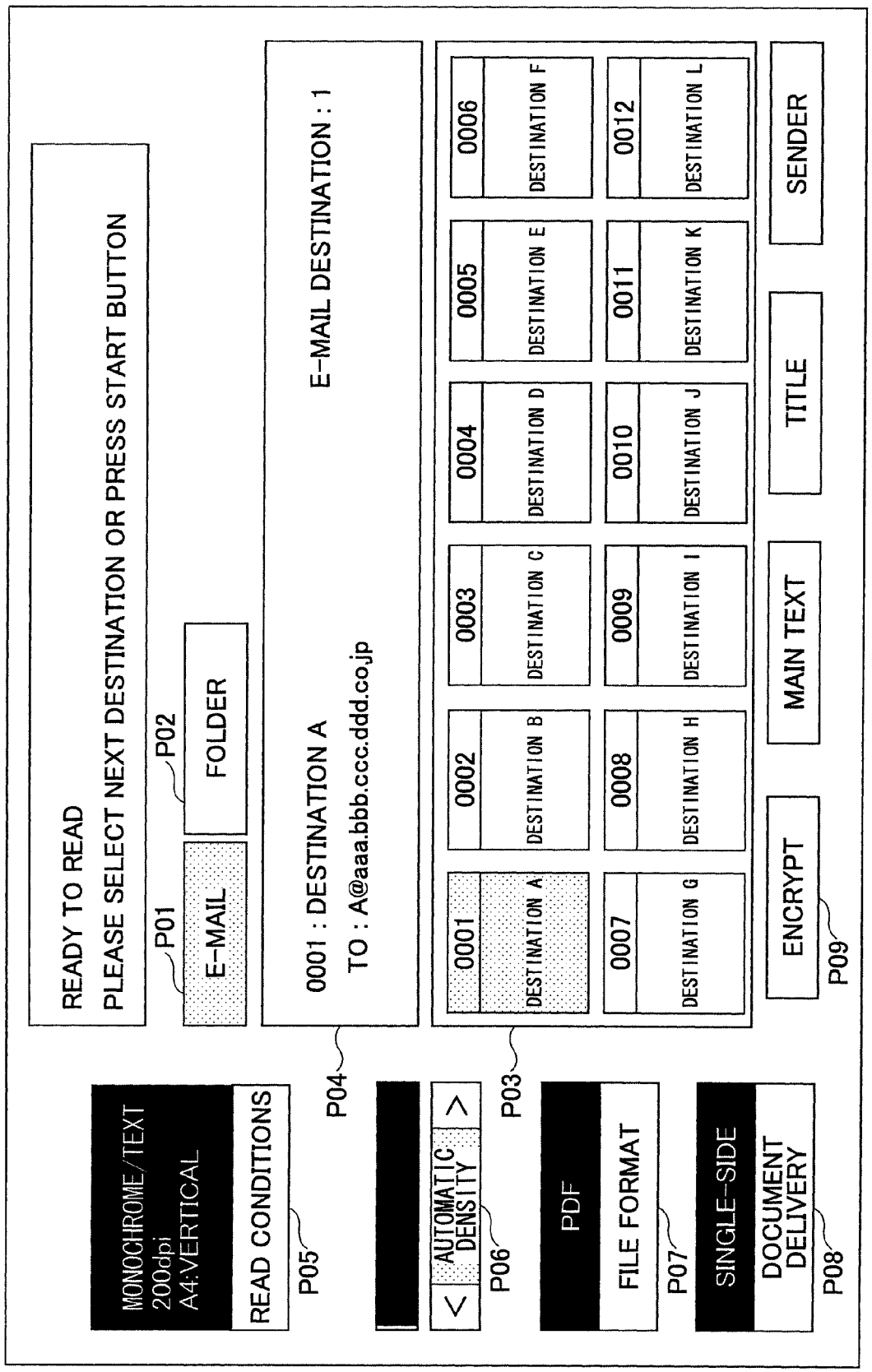
FIG. 9 is a diagram showing an example of a transmission application screen.

FIG. 9 is a diagram showing an exemplary transmission application display screen that may be displayed on the liquid crystal touch panel unit 7d of the operations indication unit 7 when a user is to perform transmission operations using the network-connected multifunction machine FX as is described above.

In this example, the user may set operation conditions such as document read mode, read conditions PO5, density PO6, file format PO7, and document delivery mode PO8, for example.

Then, the user may select a destination to which a message is to be transmitted from the destination buttons PO3 that are registered and displayed on the touch panel unit 7d. It is noted that the user may select plural destinations to simultaneously transmit a message to plural destinations, for example.

In the case where destinations to be designated include a combination of e-mail destinations, fax destinations, and file destinations, destinations associated with a particular transmission method may be displayed by selecting a relevant button PO1 or PO2, for example.

FIGS. 10A-10D are diagrams showing specific examples of the destination buttons PO3. The illustrated destination buttons PO3 are each assigned a set of the information registered in the illustrated address book information.

Figure 10A:
FIGS. 10A-10D are diagrams showing specific examples of destination buttons displayed on the transmission application screen.

Specifically, the destination button shown in FIG. 10A is registered under button ID "0001", and includes a destination name "NIHON TARO" and an icon "SY1" indicating that the transmission destination corresponds to a folder that is provided over a network.

Figure 10B:
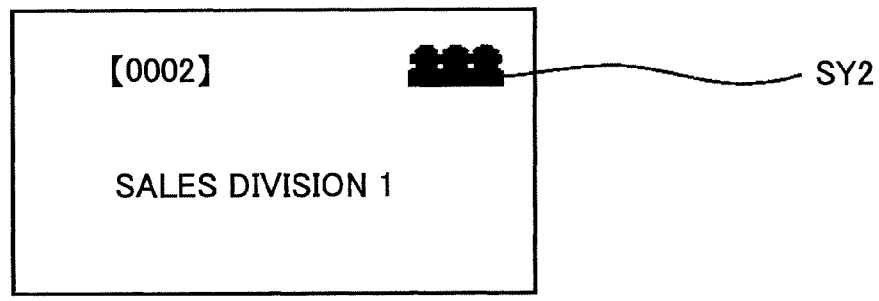

The destination button shown in FIG. 10B is registered under button ID "0002", and includes a destination name "Sales Division 1" and an icon "SY2" indicating that the transmission destination corresponds to plural destinations that are grouped together.

Figure 10C:
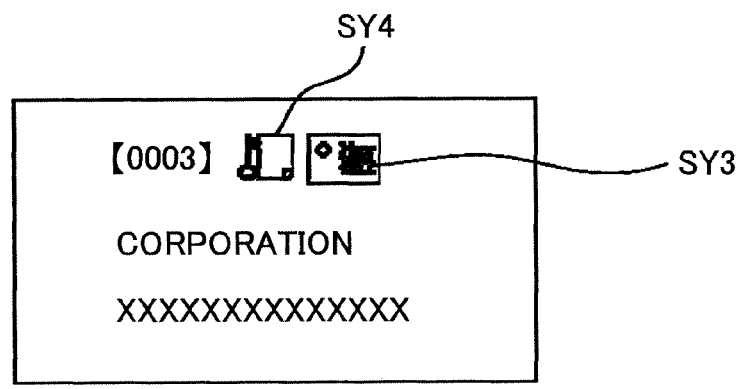

The destination button shown in FIG. 10C is registered under button ID "0003", and includes a destination name "XXXXXXXXXXXXXX Corporation", an icon "SY3" indicating that that destination corresponds to an e-mail destination, and an icon "SY4" indicating that the destination has information for encryption registered (i.e., a public key is registered).

Figure 10D:
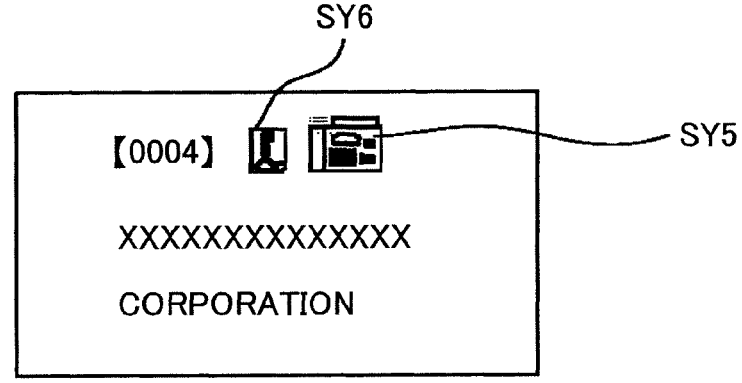

The destination button shown in FIG. 10D is registered under button ID "0004", and includes a destination name "XXXXXXXXXXXXXX Corporation", an icon "SY5" indicating that the destination is a fax destination, and an icon "SY6" indicating that transmission messages directed to the destination should always be encrypted (i.e., the encryption flag is set to "encrypt").

The user may select one or more destinations as is necessary or desired from the operations screen indicating these destination buttons.

FIG. 11 is a flowchart illustrating process steps for performing a transmission job according to one example.

According to this example, a user may set a transmission document on the scanner 5 (step 101), operate the operations indication unit 7 to set the network-connected multifunction machine FX to read mode (step 102), and input at least one destination (step 103) to start transmission operations. The destination input operations may include setting the destination buttons to on mode and operating the ten keys 7c of the operations indication unit 7, for example.

Then, the network-connected multifunction machine FX may be in standby mode until the user presses the start key 7a (loop formed by steps 102, 103, and negative determination NO in step 104). It is noted that at this point, the user may also set conditions pertaining to encryption for the designated transmission operations (transmission job).

When the start key 7a is pressed and a positive determination (YES) is made in step 104, the document set on the scanner 5 is read according to the designated read mode and the read image data are stored in the magnetic disk unit 9 (step 105). It is noted that the stored image data may be compressed as is necessary or desired, for example.

In a case where the destinations designated by the user include one or more e-mail destinations (step 106, YES), an e-mail transmission process directed to the designated e-mail destinations is performed (step 107). On the other hand, when a negative determination (NO) is made in step 106, the e-mail transmission process is not performed.

In a case where the destinations designated by the user include one or more fax destinations (G3 Fax destination) (step 108, YES), a fax (G3 Fax) transmission process directed to the designated fax destinations is performed (step 109). On the other hand, when a negative determination (NO) is made in step 108, the fax transmission process of step 109 is not performed.

In a case where the destinations designated by the user includes one or more file destinations (file transfers) (step 110, YES), a file transfer process that is directed to the designated file destinations is performed (step 111). On the other hand, when a negative determination (NO) is made in step 110, the file transfer process of step 111 is not performed.

Figure 12:
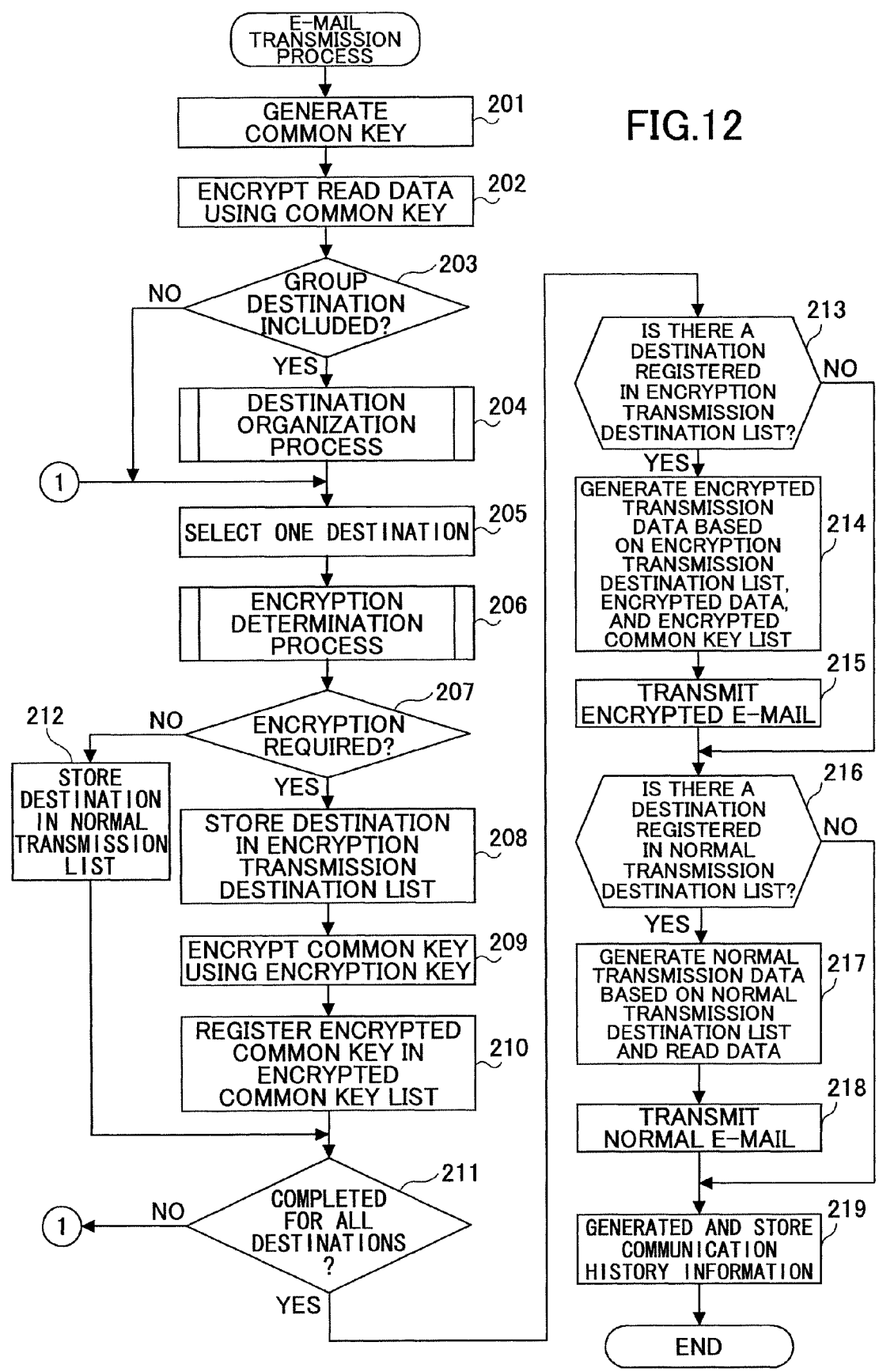
FIG. 12 is a flowchart illustrating an e-mail transmission process according to one example.

FIG. 12 is a flowchart illustrating exemplary process steps of the e-mail transmission process of step 107.

According to this example, a common key used for encryption communication is generated (step 201), read data corresponding to a transmission message is encrypted according to a predetermined encryption scheme using the common key generated in step 201, and the encrypted data are stored in the magnetic disk unit 9 (step 202).

Then, a determination is made as to whether the destinations designated by the user include a group destination (step 203), and if a positive determination (YES) is made, a destination organization process is performed for acquiring the e-mail destinations registered in the group destination (step 204). By performing the destination organization process of step 204, the e-mail destinations to which the present e-mail transmission process is directed may be organized. For example, when overlapping destination designations are detected as a result of designating a single e-mail destination when this single destination actually belongs to a designated group destination, one of the overlapping designations may be retained and the rest of the designations may be canceled. On the other hand, when a negative determination (NO) is made in step 203, the destination organization process of step 204 is not performed.

Then, one e-mail destination is selected from the designated destinations (step 205), and an encryption determination process is performed for determining whether the selected e-mail destination requires transmission through encryption communication (step 206).

In the case where it is determined by the encryption determination process that encryption communication is required for the selected e-mail destination (step 207, YES), the selected e-mail destination is stored in an encryption transmission destination list (step 208), the common key generated in step 201 is encrypted using the public key A stored in association with the selected e-mail destination (step 209), and the encrypted common key is then registered in an encrypted common key list (step 210).

Then, a determination is made as to whether the encryption determination process has been performed on all the designated destinations (step 211), and if a negative determination (NO) is made in step 211, the process goes back to step 205 so that a next e-mail destination may be selected and the encryption determination process may be performed thereon.

When the selected e-mail destination does not require encryption communication so that a negative determination (NO) is made in step 207, the selected e-mail destination is stored in a normal transmission destination list (step 212) after which the process moves on to step 211.

When the encryption determination process is performed on all the designated e-mail destinations so that a positive determination (YES) is made in step 211, a determination is made as to whether at least one e-mail destination is registered in the encryption transmission destination list (step 213).

If a positive determination (YES) is made in step 213, encrypted transmission data are generated based on the encryption transmission destination list, the encrypted data, and the encrypted common key list (step 214), and e-mail containing the encrypted transmission data generated in step 214 (encrypted e-mail) is transmitted to the relevant e-mail destinations (step 215). On the other hand, if a negative determination (NO) is made in step 213, steps 214 and 215 are not performed.

Then, a determination is made as to whether at least one e-mail destination is registered in the normal transmission destination list (step 216). If a positive determination (YES) is made in step 216, normal transmission data are generated based on the normal transmission destination list and the read data (step 217), and an e-mail containing the normal transmission data generated in step 217 is transmitted to the relevant e-mail destinations (step 218). On the other hand, when a negative determination (NO) is made in step 216, steps 217 and 218 are not performed.

Then, transmission history information pertaining to the present e-mail transmission process is generated and stored (step 219) after which the relevant e-mail transmission process is ended.

Figure 13:
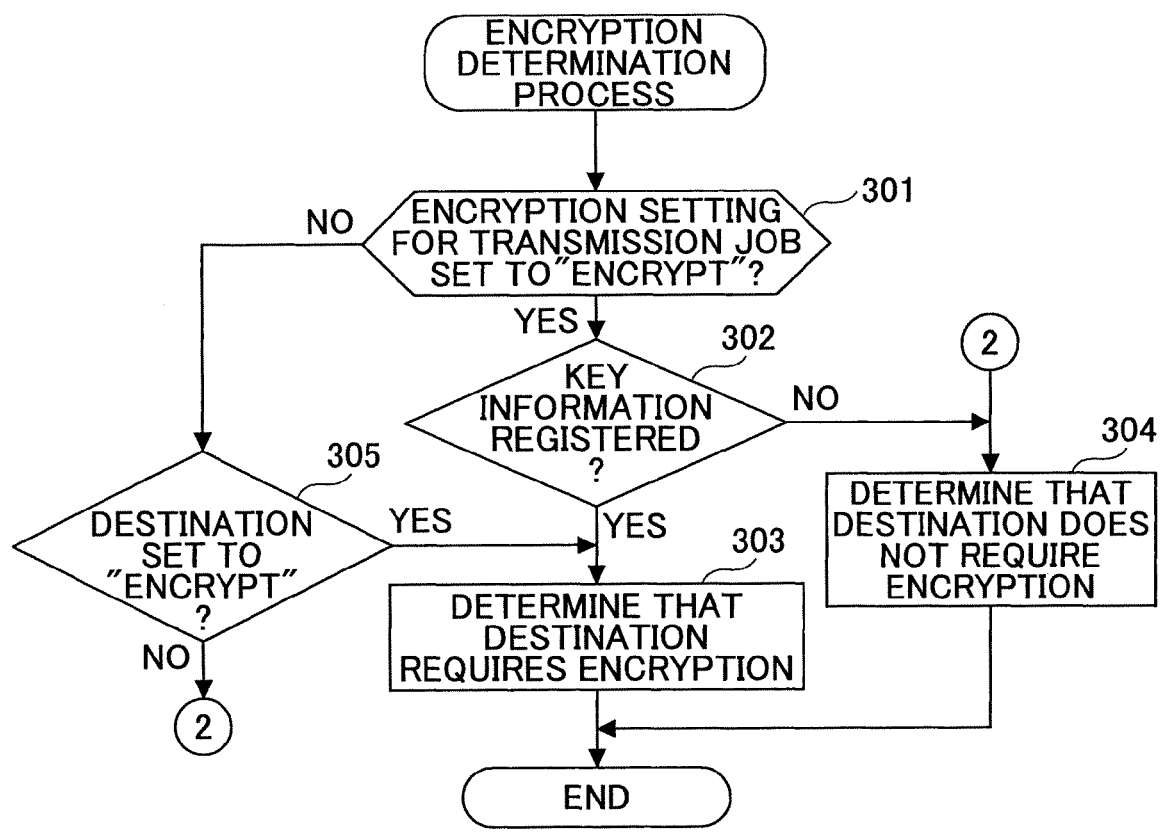
FIG. 13 is a flowchart illustrating an encryption determination process according to one example.

FIG. 13 is a flowchart illustrating exemplary process steps of the encryption determination process performed in step 206 of FIG. 12.

According to this example, a determination is made as to whether encryption setting for the present transmission job is set to "encrypt" (step 301). It is noted that the encryption setting of a transmission job may be set by the user.

When a positive determination (YES) is made in step 301, a determination is made as to whether public key information is registered in association with a relevant destination (e.g., if the relevant destination is an e-mail destination, the public key A may be registered; and if the relevant destination is a fax destination, the public key B may be registered) (step 302). When a positive determination (YES) is made in step 302, it is determined that the relevant destination requires encryption of transmission data directed thereto (303).

On the other hand, when a negative determination (NO) is made in step 302, it is determined that the relevant destination does not require encryption of transmission data directed thereto (304).

Also, when it is determined that the encryption setting for a transmission job is not set to "encrypt" so that a negative determination (NO) is made in step 301, a determination is made as to whether the encryption flag value of a relevant destination is set to "encrypt" (step 305).

When a positive determination (YES) is made in step 305, the process moves on to step 303 where it is determined that the relevant destination requires encryption of transmission data directed thereto. On the other hand, when a negative determination (NO) is made in step 305, the process moves on to step 304 where it is determined that the relevant destination does not require encryption of transmission data directed thereto.

Figure 14:
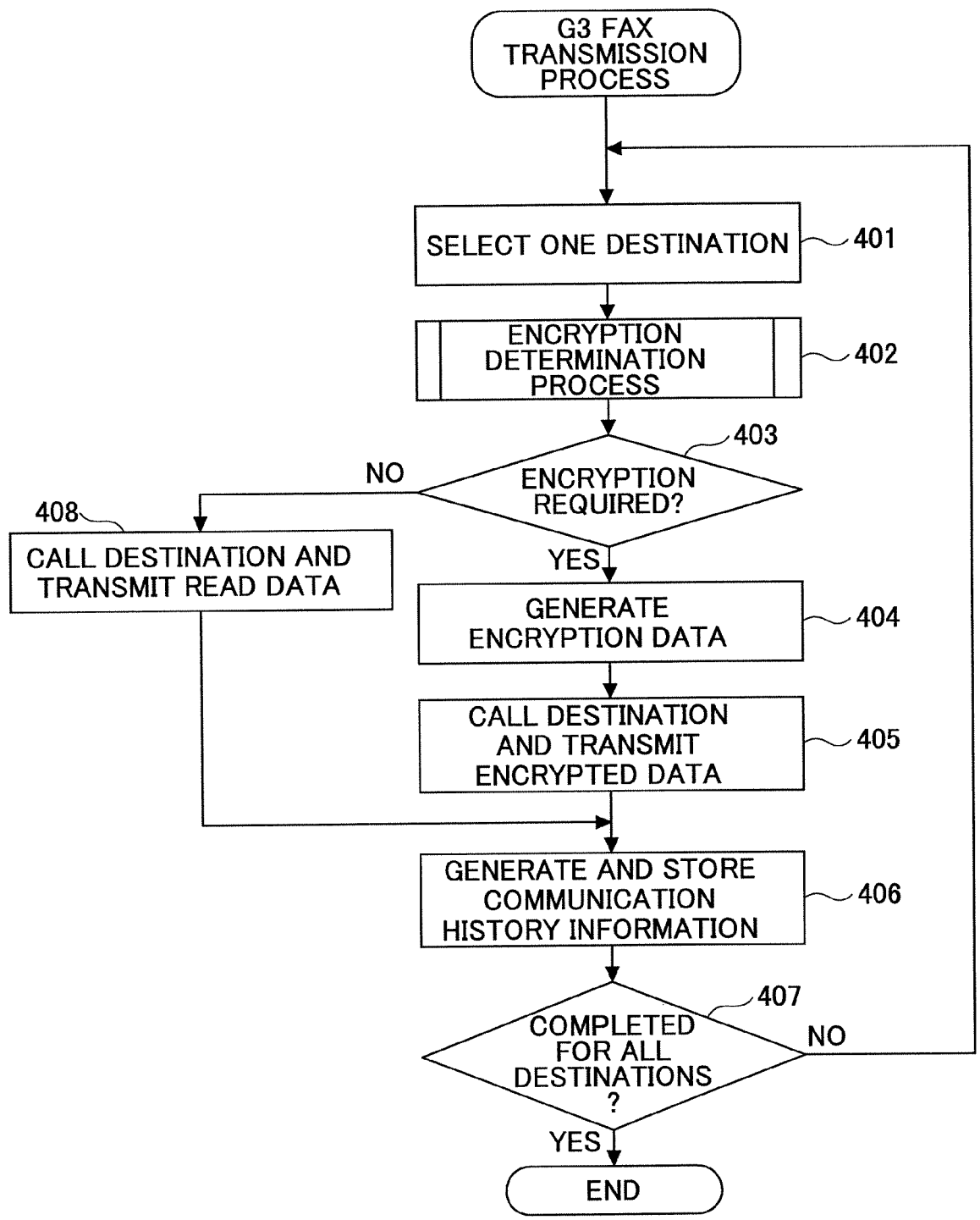
FIG. 14 is a flowchart illustrating a G3 Fax transmission process according to one example.

FIG. 14 is a flowchart illustrating exemplary process steps of the G3 Fax transmission process performed in step 109 of FIG. 11.

According to this example, one fax destination is selected from the designated destinations (step 401), and the encryption determination process illustrated in FIG. 13 is performed on the selected destination (step 402). Then, the outcome of the encryption determination process for the selected destination is checked to determine whether the relevant destination requires encryption communication (step 403).

When a positive determination (YES) is made in step 403, the public key B that is registered in association with fax destinations is acquired for the relevant destination, and the acquired public key B is used on the read data to generate encrypted data (step 404).

Then, a call is made to the relevant destination using the network control unit 11 and the encrypted data generated in step 404 are transmitted to the relevant destination predetermined through predetermined Group 3 Fax communication (encryption communication) operations (step 405).

Then, communication history information pertaining to the transmission operations for the selected destination is generated and stored (step 406).

Then, a determination is made as to whether transmission operations have been completed for all the designated fax destinations (step 407). When a negative determination (NO) is made in step 407, the process goes back to step 401 so that transmission operations may be performed for the remaining destinations.

When a negative determination (NO) is made in step 403, a call is made to the relevant destination using the network control unit 11 and the read data are transmitted to the relevant destination through predetermined Group 3 Fax communication operations (step 408).

Then, the process moves on to step 406 where communication history information pertaining to the corresponding transmission operations is generated and stored. Then, the process moves on to step 407. When it is determined that transmission operations have been performed for all the designated fax destinations (step 407, YES), the present G3 Fax transmission process may be ended.

Figure 15:
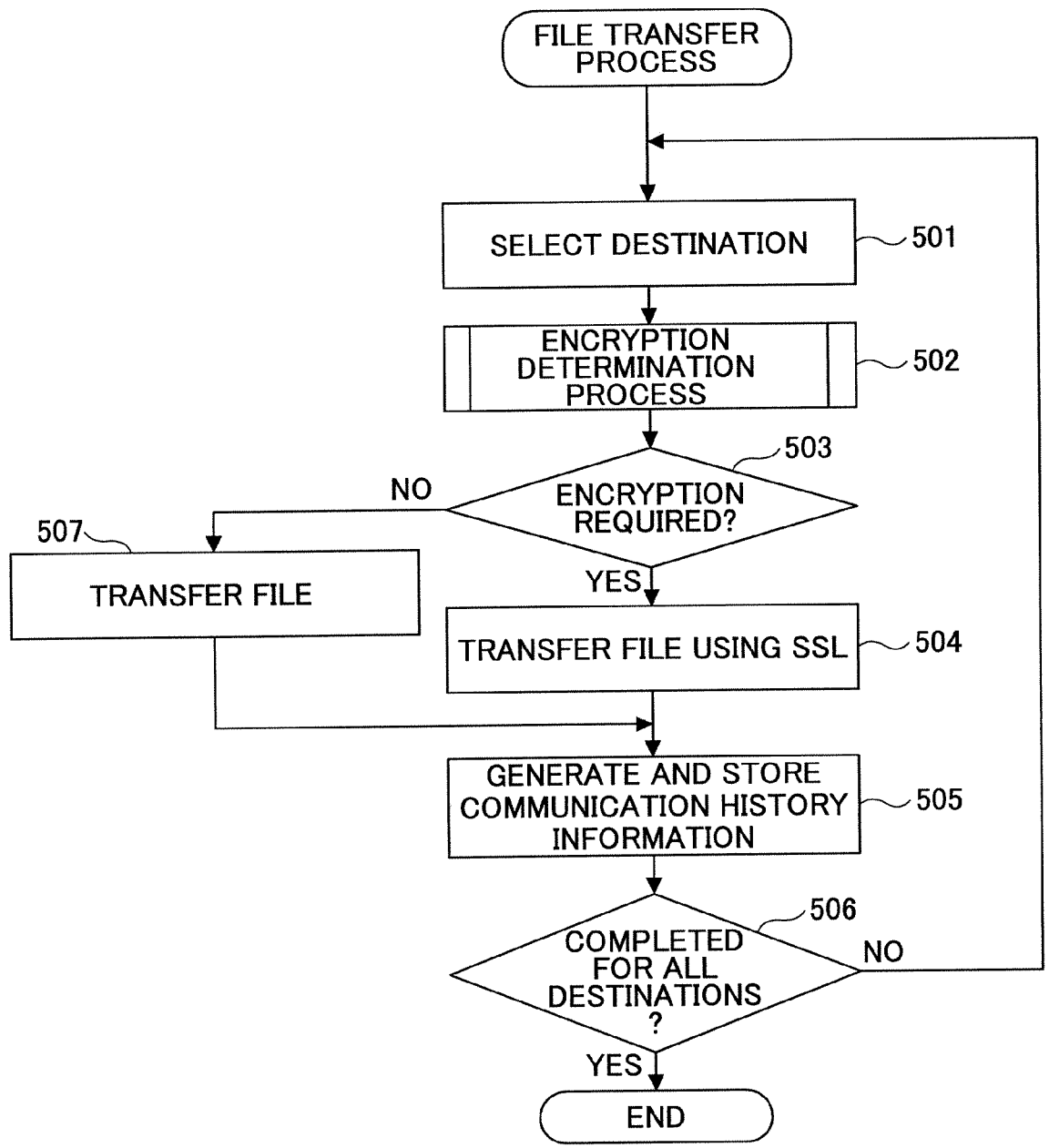
FIG. 15 is a flowchart illustrating a file transfer process according to one example.

FIG. 15 is a flowchart illustrating exemplary process steps of the file transfer process performed in step 111 of FIG. 11.

According to this example, a file destination is selected from the designated destinations (step 501), and the encryption determination process as is shown in FIG. 13 is performed on the selected destination (step 502). Then, the outcome of the encryption determination process for the relevant destination is checked to determine whether the relevant destination requires encryption communication (step 503).

When a positive determination (YES) is made in step 503, connection in SSL mode is established with the file server SF using a login user name and a login password that are registered in association with the relevant destination and the read data are transferred to a network path registered in association with the relevant file destination to be stored in the file server SF (step 504).

Then, communication history information pertaining to the present transmission operations is generated and stored (step 505).

Then, a determination is made as to whether transmission operations have been completed for all the designated file destinations (step 506). When a negative determination (NO) is made in step 506, the process goes back to step 501, and transmission operations are performed for the remaining destinations.

When a negative determination (NO) is made in step 503, connection in non-SSL mode is established with the file server SF, and read data are transferred to the network path that is registered in association with the relevant destination to store the data in the file server SF (step 507).

Then, the process moves on to step 505 where communication history information pertaining to the present transmission operations is generated. Then, the process moves on to step 506 to determine whether transmission operations have been completed for all the designated file destinations.

As can be appreciated, according to the above example, destinations that require encryption communication and destinations that do no require encryption communication may be designated in one designation operation sequence so that the burden imposed on the user for designating destinations may be reduced and user-friendliness may be improved, for example.

Figure 16:
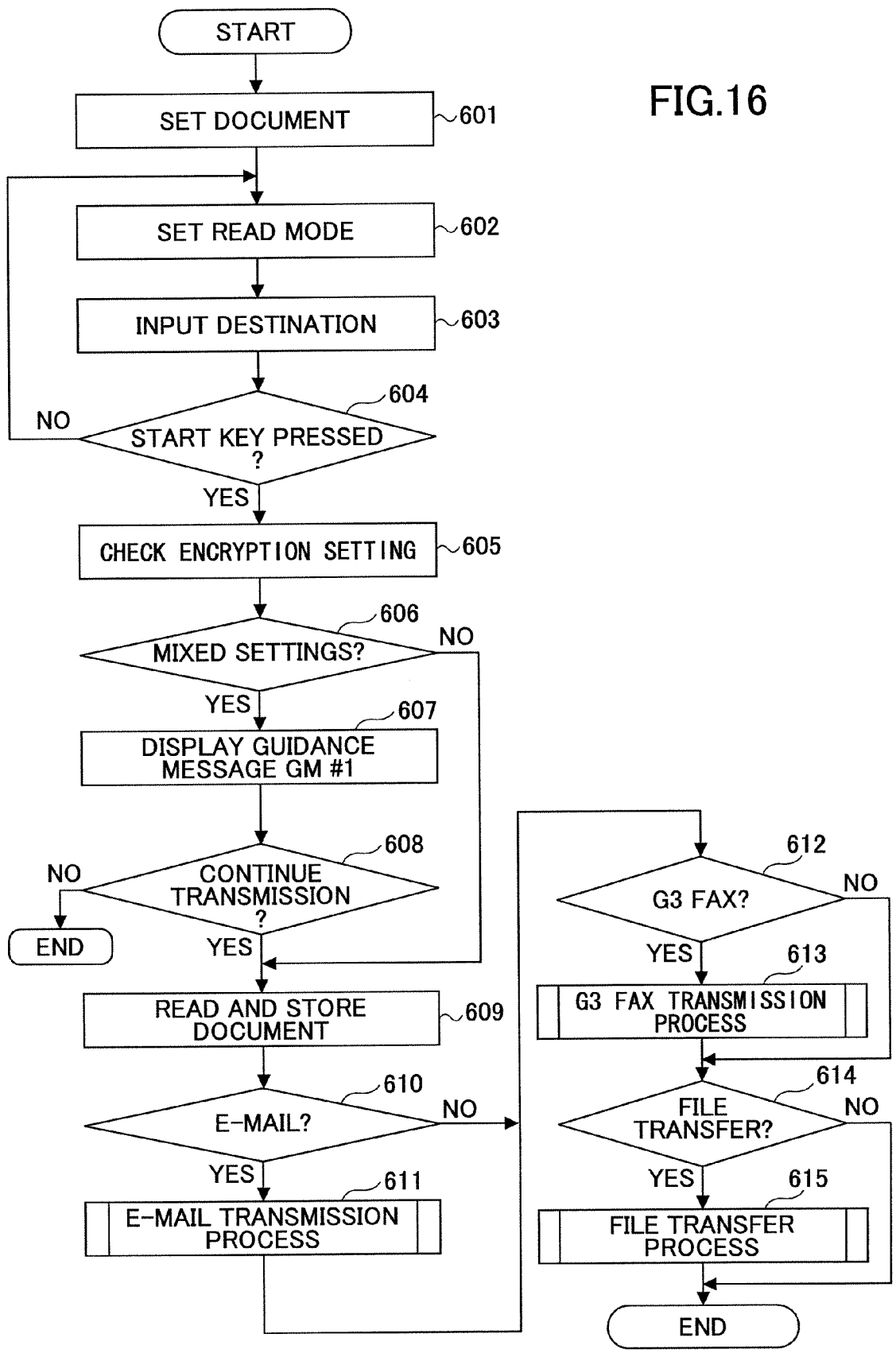
FIG. 16 is a flowchart illustrating a transmission process according to another example.

FIG. 16 is a flowchart illustrating another exemplary sequence of process steps for executing a transmission job.

According to this example, a user may set a transmission document on the scanner 5 (step 601), operate the operations indication unit 7 to set the network-connected multifunction machine FX to read mode (step 602), and input at least one destination (step 603) to start transmission operations. The destination input operations may include setting the destination buttons to on mode and operating the ten keys 7c of the operations indication unit 7, for example.

Then, the network-connected multifunction machine FX may be in standby mode until the user presses the start key 7a (loop formed by steps 602, 603, and negative determination NO in step 604). It is noted that at this point, the user may also set conditions pertaining to encryption for the designated transmission operations (transmission job).

When the start key 7a is pressed so that a positive determination (YES) is made in step 604, the encryption settings of the designated destinations are checked (step 605), and a determination is made as to whether the destinations designated in step 603 include both a destination having an encryption flag set on and a destination having an encryption flag set off (step 606).

Figure 17:
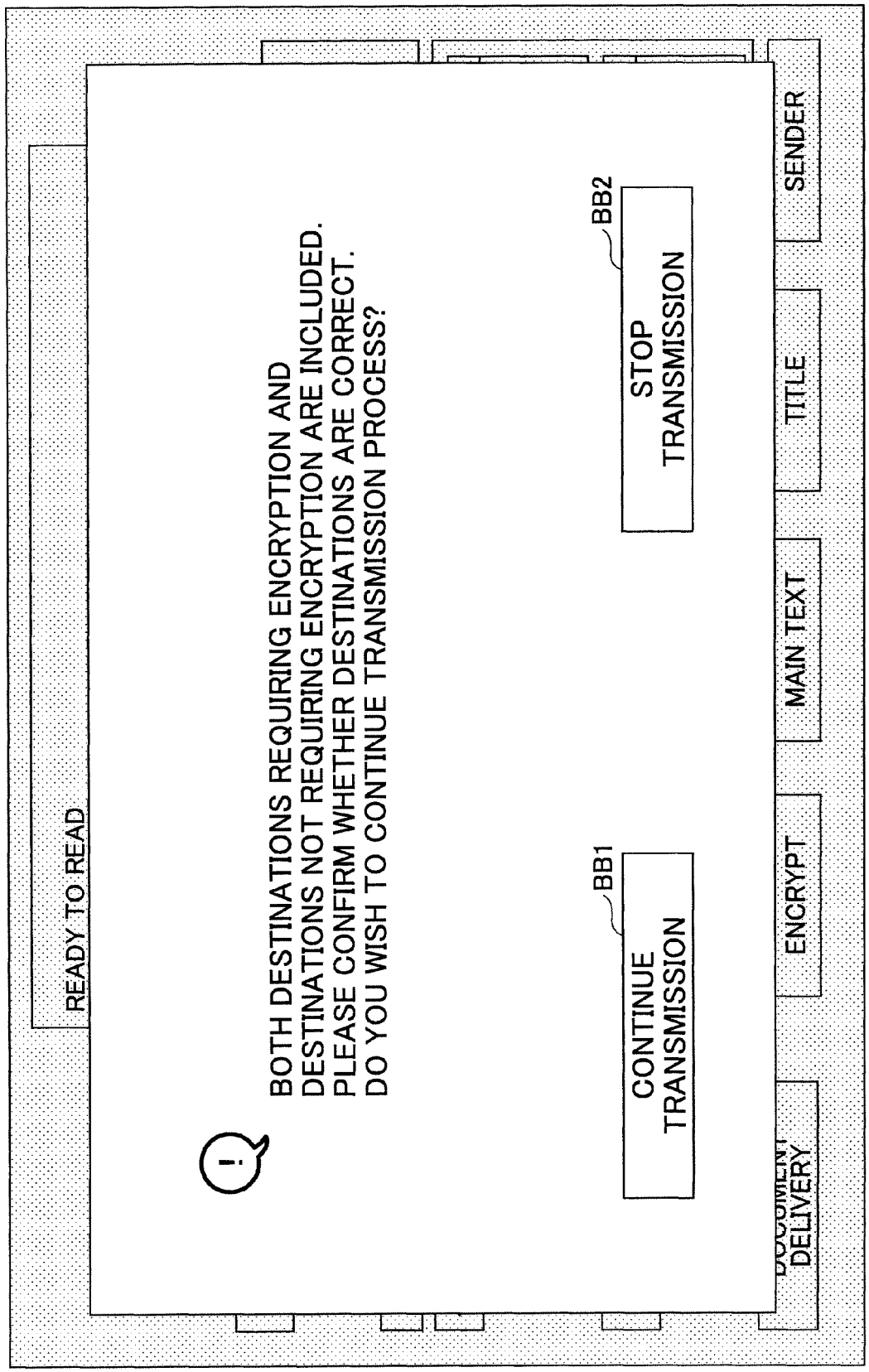
FIG. 17 is a diagram showing a guidance message screen that may be displayed in the transmission process of FIG. 16.

When it is determined that both types of destinations (i.e., destinations with encryption ON flags and destinations with encryption OFF flags) are designated so that a positive determination (YES) is made in step 606, a guidance message GM #1 as is shown in FIG. 17 is displayed on the display screen (step 607), and the user is prompted to select whether to continue the transmission operations by operating a transmission continuation button BB1 of the guidance message GM #1 or terminate the transmission operations by operating a transmission stop button BB2 of the guidance message GM #1 (step 608).

In a case where the transmission stop button BB2 is operated so that a positive determination (YES) is made in step 608, the document image set on the scanner 5 is read according to the designated read mode, and the read image data are stored in the magnetic disk unit 9 (step 609). In one embodiment, the image data to be stored may be compressed as is necessary or desired.

In a case where the destinations designated by the user include one or more e-mail destinations (step 610, YES), an e-mail transmission process directed to the designated e-mail destinations is performed (step 611). On the other hand, when a negative determination (NO) is made in step 610, the e-mail transmission process of step 611 is not performed.

In a case where the destinations designated by the user include one or more fax destinations (G3 Fax destinations) (step 612, YES), a fax (G3 Fax) transmission process directed to the designated fax destinations is performed (step 613). On the other hand, when a negative determination (NO) is made in step 612, the fax transmission process of step 613 is not performed.

In a case where the destinations designated by the user include one or more file destinations (file transfers) (step 614, YES), a file transfer process that is directed to the designated destinations is performed (step 615). On the other hand, when a negative determination (NO) is made in step 614, the file transfer process of step 615 is not performed.

As can be appreciated, in the present example, when designated destinations include destinations requiring encryption communication as well as destinations not requiring encryption communication, a guidance message informing the user that both types of destinations are designated is displayed in order to prompt the user to select whether to continue with the transmission operations. In this way, user errors in destination designation operations may be avoided, for example.

Figure 18:
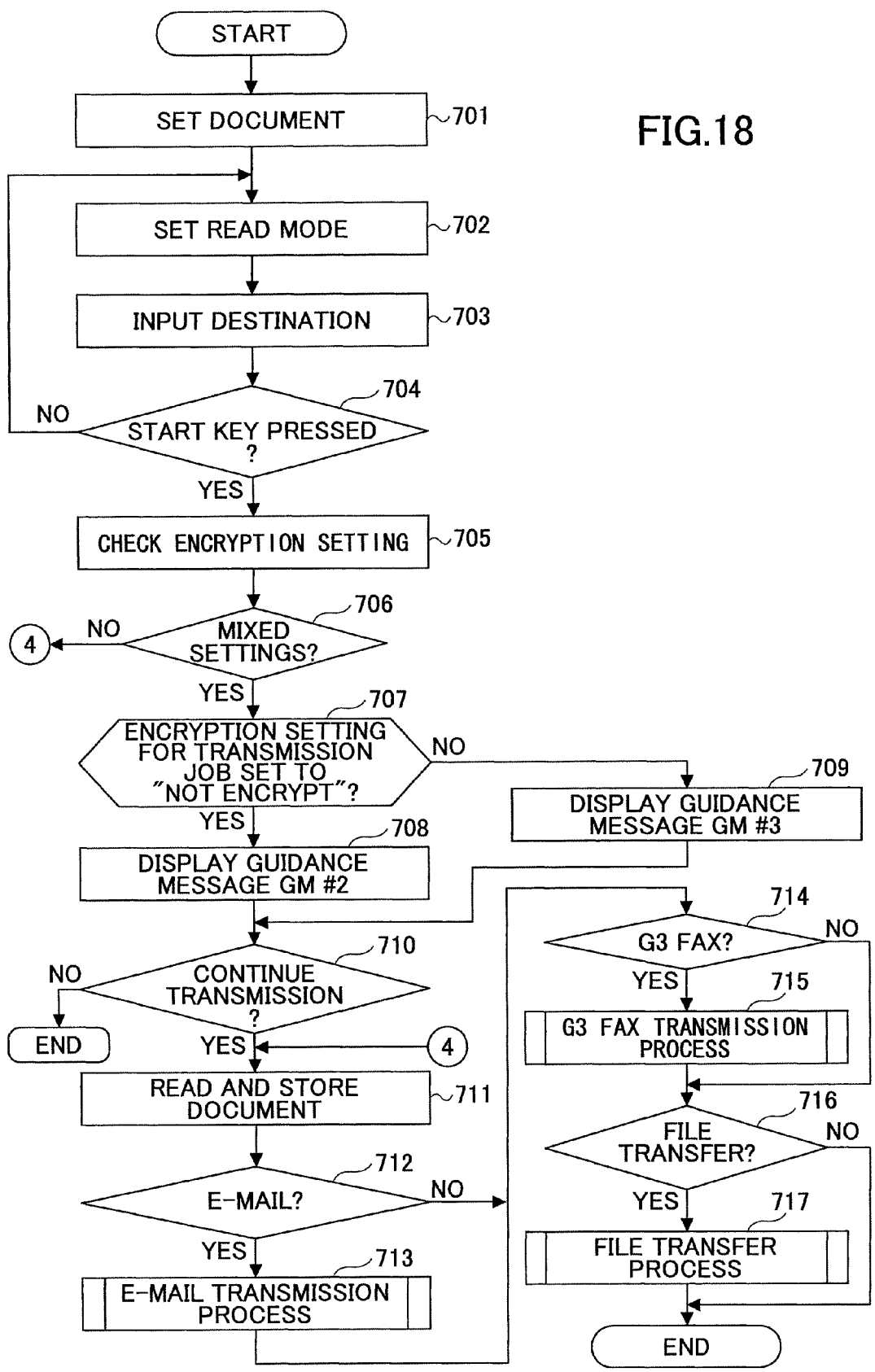
FIG. 18 is a flowchart illustrating a transmission process according to another example.

FIG. 18 is a flowchart illustrating another exemplary sequence of process steps for performing a transmission job.

According to the present example, a user may set a transmission document on the scanner 5 (step 701), operate the operations indication unit 7 to set the network-connected multifunction machine FX to read mode (step 702), and input at least one destination (step 703) to start transmission operations. Then, the network-connected multifunction machine FX may be in standby mode until the user presses the start key 7a (loop formed by steps 702, 703, and negative determination NO in step 704). It is noted that at this point, the user may also set conditions pertaining to encryption for the designated transmission operations (transmission job).

When the start key 7a is pressed so that a positive determination (YES) is made in step 704, the encryption settings of the designated destinations are checked (step 705), and a determination is made as to whether the destinations designated in step 703 include both a destination having an encryption flag set on (i.e., "encrypt") and a destination having an encryption flag set off (i.e., "not encrypt")(steps 705 and 706).

When it is determined that both types of destinations (i.e., destinations with encryption ON flags and destinations with encryption OFF flags) are designated so that a positive determination (YES) is made in step 706, a determination is made as to whether the encryption setting of the transmission job is set to "not encrypt" (step 707).

Figure 19:
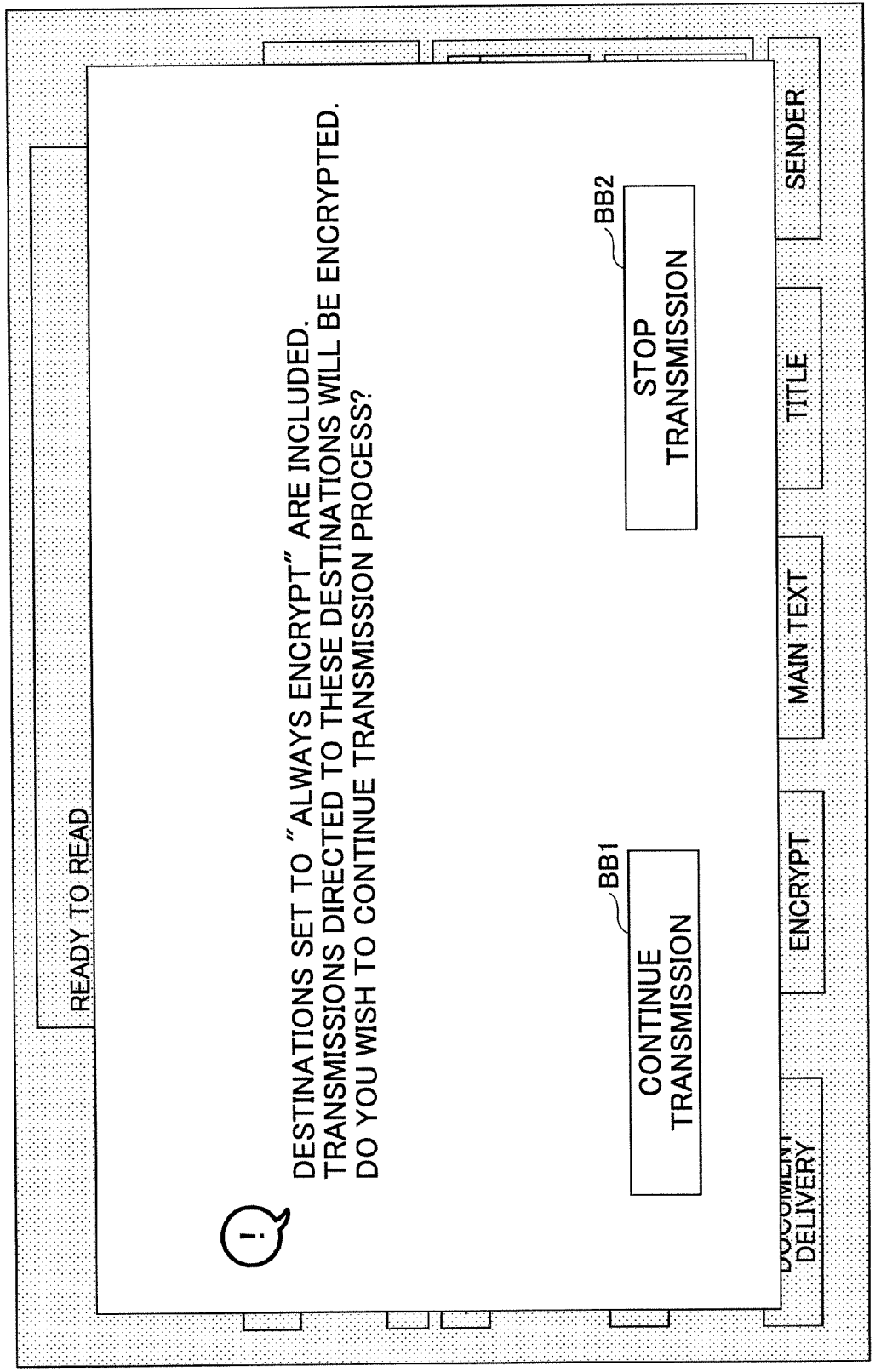
FIG. 19 is a diagram showing a guidance message screen that may be displayed in the transmission process of FIG. 18.
Figure 20:
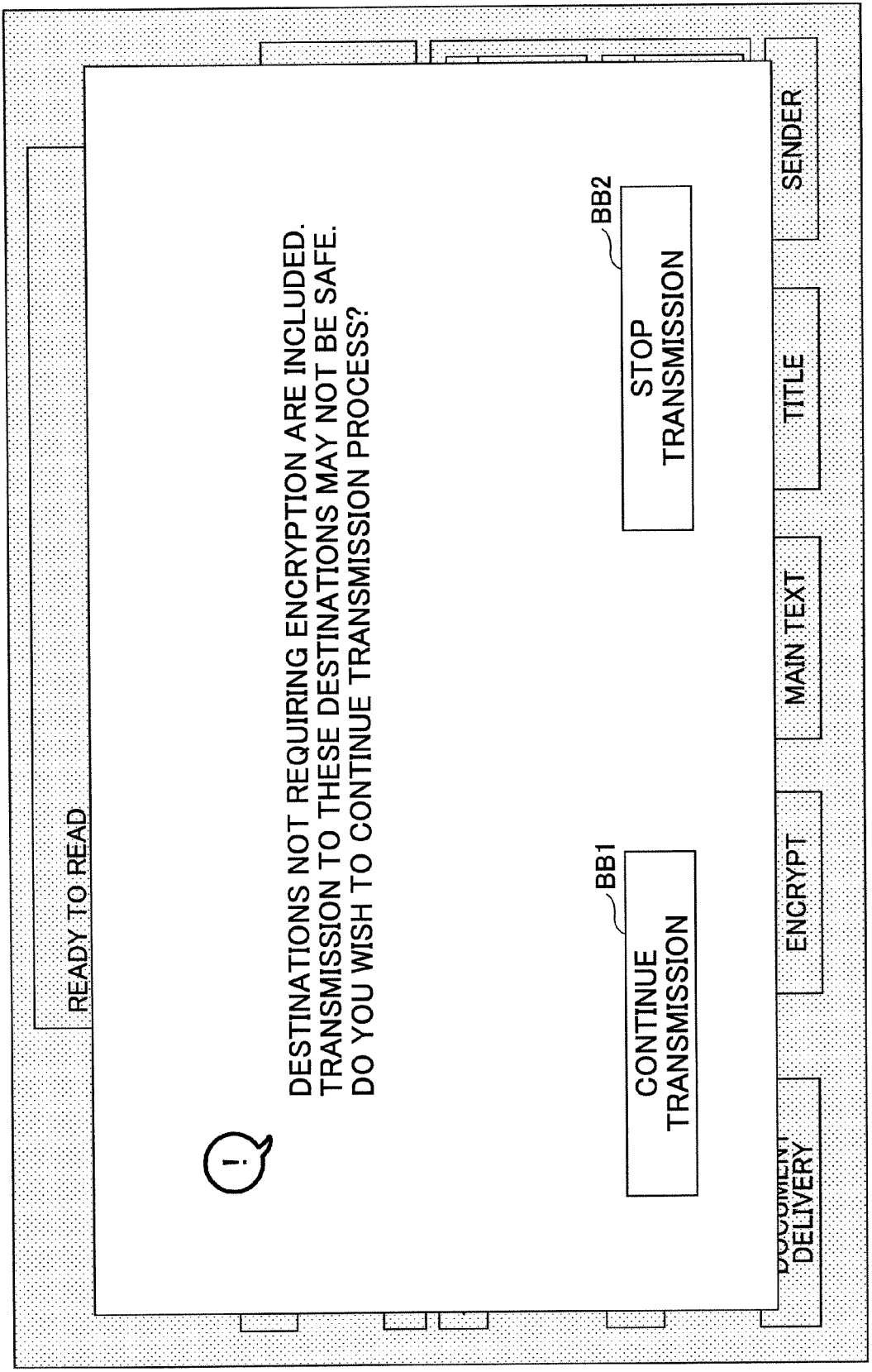
FIG. 20 is a diagram illustrating another guidance message screen that may be displayed in the transmission process of FIG. 18.

If a positive determination (YES) is made in step 707, a guidance message GM #2 as is shown in FIG. 19 is displayed on the display screen that informs that user that one or more destinations that require encryption communication are included (step 708). On the other hand, when a negative determination (NO) is made in step 708, a guidance message GM #3 as is shown in FIG. 20 is displayed on the display screen that informs the user that one or more destinations that does not require encryption communication are included (step 709).

When the guidance message GM #2 or GM #3 is displayed, the user may operate a transmission continuation button BB1 or a transmission stop button BB2 to select whether to continue with the transmission operations (step 710).

In a case where the transmission stop button BB2 is operated so that a positive determination (YES) is made in step 710, the document image set on the scanner 5 is read according to the designated read mode, and the read image data are stored in the magnetic disk unit 9 (step 711). In one embodiment, the image data to be stored may be compressed as is necessary or desired.

In a case where the destinations designated by the user include one or more e-mail destinations (step 712, YES), an e-mail transmission process as is described above that is directed to the designated e-mail destinations is performed (step 713). On the other hand, when a negative determination (NO) is made in step 712, the e-mail transmission process of step 713 is not performed.

In a case where the destinations designated by the user include one or more fax destinations (G3 Fax destinations) (step 714, YES), a fax (G3 Fax) transmission process directed to the designated fax destinations is performed (step 715). On the other hand, when a negative determination (NO) is made in step 714, the fax transmission process of step 715 is not performed.

In a case where the destinations designated by the user includes one or more file destinations (file transfers) (step 716, YES), a file transfer process that is directed to the designated destinations is performed (step 717). On the other hand, when a negative determination (NO) is made in step 716, the file transfer process of step 717 is not performed.

As can be appreciated, in the present example, when designated destinations include destinations with encryption settings that are different from the encryption setting set for the relevant transmission job, a guidance message informing the user of such an effect is displayed on the display screen in order to prompt the user to select whether to continue with the transmission operations. In this way, user errors in destination designation operations may be avoided, for example.

Figure 21:
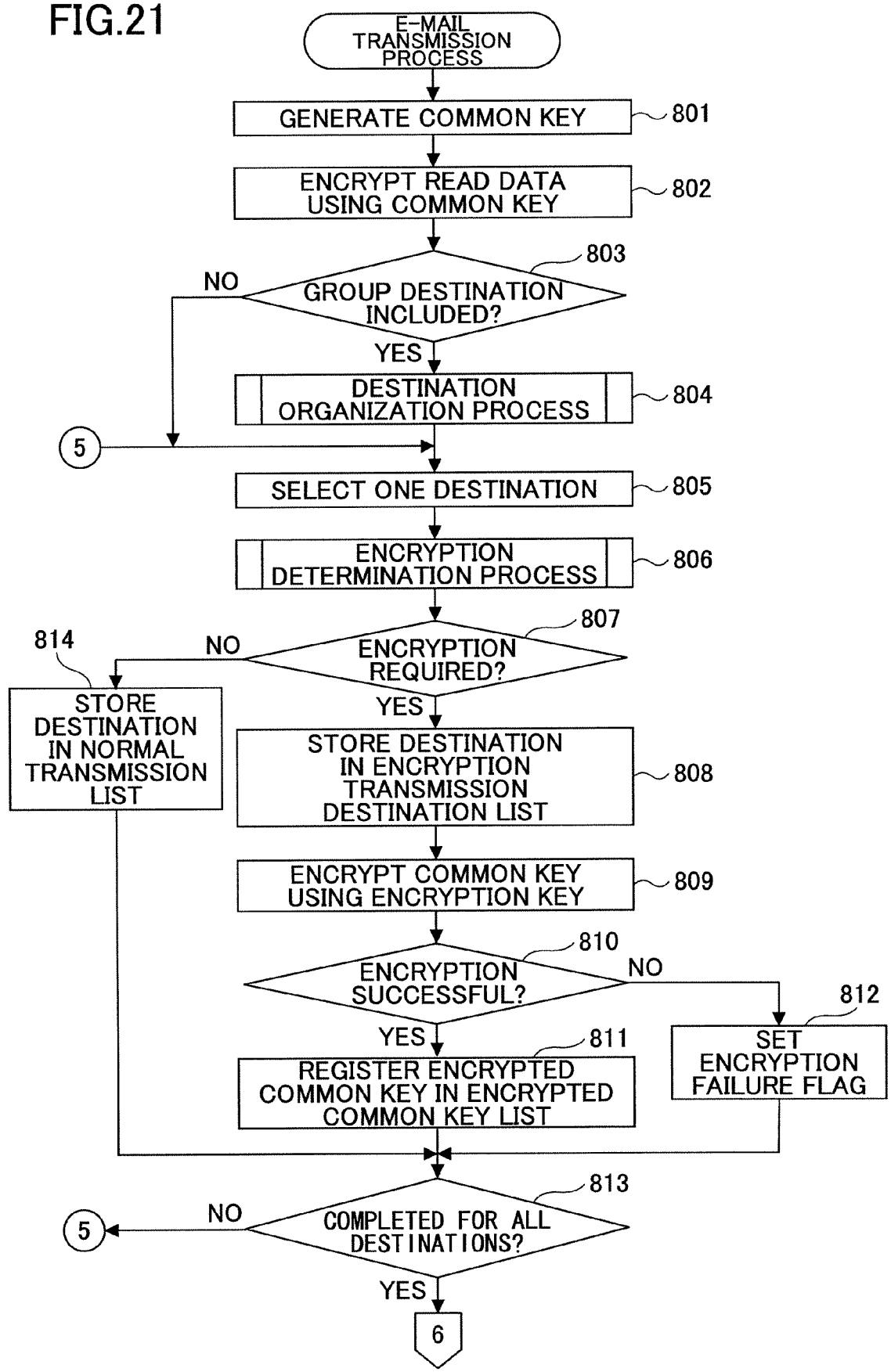
FIG. 21 is a flowchart illustrating process steps of an e-mail transmission process according to another example.
Figure 22:
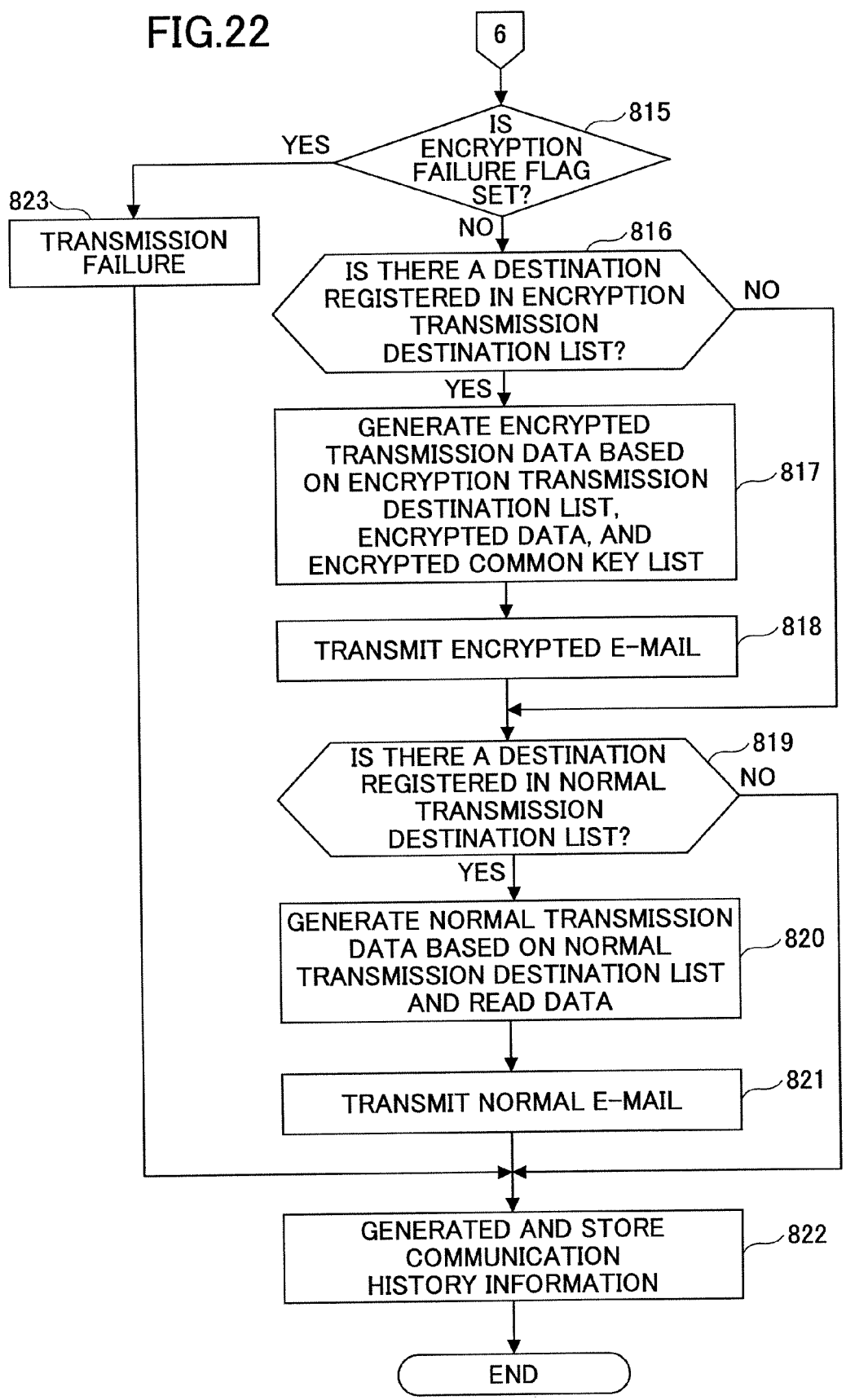
FIG. 22 is a flowchart illustrating process steps of the e-mail transmission process continued from FIG. 21.

FIGS. 21 and 22 are flowcharts illustrating another exemplary sequence of process steps for performing an e-mail transmission process.

According to this example, a common key used for encryption communication is generated (step 801), read data corresponding to a transmission message is encrypted according to a predetermined encryption scheme using the common key generated in step 801, and the encrypted data are stored in the magnetic disk unit 9 (step 802).

Then, a determination is made as to whether the destinations designated by the user include a group destination (step 803), and if a positive determination (YES) is made, a destination organization process is performed for acquiring the e-mail destinations registered in the group destination (step 804). By performing the destination organization process of step 804, the e-mail destinations to which the present e-mail transmission process is directed may be organized. For example, when overlapping destination designations are detected as a result of designating a single e-mail destination when this single destination actually belongs to a designated group destination, one of the overlapping designations may be retained and the rest of the designations may be canceled. On the other hand, when a negative determination (NO) is made in step 803, the destination organization process of step 804 is not performed.

Then, one e-mail destination is selected from the designated destinations (step 805), and an encryption determination process is performed for determining whether encryption communication is to be implemented for the selected e-mail destination (step 806).

In the case where it is determined by the encryption determination process that encryption communication is to be implemented for the selected e-mail destination (step 807, YES), the selected e-mail destination is stored in an encryption transmission destination list (step 808), the common key generated in step 801 is encrypted using the public key A stored in association with the selected e-mail destination (step 809).

Then, a determination is made as to whether encryption has been properly performed on the common key (step 810), and when a positive determination (YES) is made, the encrypted common key generated in step 809 is registered in an encrypted common key list (step 811). When a negative determination (NO) is made in step 810, an encryption failure flag is set (step 812). It is noted that the encryption failure flag may be reset at the initial point of performing an e-mail transmission process.

Then, a determination is made as to whether the encryption determination process has been performed on all the designated destinations (step 813), and if a negative determination (NO) is made in step 813, the process goes back to step 805 so that a next e-mail destination may be selected and the encryption determination process may be performed thereon.

In a case where the encryption determination process determines that encryption communication is not required for the selected e-mail destination so that a negative determination (NO) is made in step 807, the selected e-mail destination is stored in a normal transmission destination list (step 814) after which the process moves on to step 813.

When the encryption determination process is performed on all the designated e-mail destinations so that a positive determination (YES) is made in step 813, a determination is made as to whether one or more encryption failure flags are set (step 815). When encryption of the common key is successfully performed for all the relevant destinations so that a negative determination (NO) is made in step 815, a determination is made as to whether one or more destinations are registered in the encryption transmission destination list (step 816).

In a case where a positive determination (YES) is made in step 816, encrypted transmission data are generated based on the encryption transmission destination list, the encrypted data, and the encrypted common key list (step 817), and an e-mail containing the encrypted transmission data generated in step 817 (encrypted e-mail) is transmitted to the relevant e-mail destinations (step 818). On the other hand, when a negative determination (NO) is made in step 816, steps 817 and 818 are not performed.

Then, a determination is made as to whether at least one e-mail destination is registered in the normal transmission destination list (step 819). If a positive determination (YES) is made in step 819, normal transmission data are generated based on the normal transmission destination list and the read data (step 820), and e-mail containing the normal transmission data generated in step 820 are transmitted to the relevant e-mail destinations (step 821). On the other hand, when a negative determination (NO) is made in step 819, steps 820 and 821 are not performed.

Then, transmission history information pertaining to the present e-mail transmission operations is generated and stored (step 822) after which the relevant e-mail transmission process is ended.

In a case where one or more encryption failure flags are set so that a positive determination (YES) is made in step 815, it is determined that the present transmission job has been a failure (step 823), and the process moves on to step 822 where communication history information pertaining to the present transmission job is generated and stored (step 823).

As can be appreciated, according to the present example, when an encryption process (public key encryption process) performed on at least one destination ends in failure, the relevant transmission job is not performed. For example, such an arrangement may be used in the case where highly confidential document information is transmitted.

Figure 23:
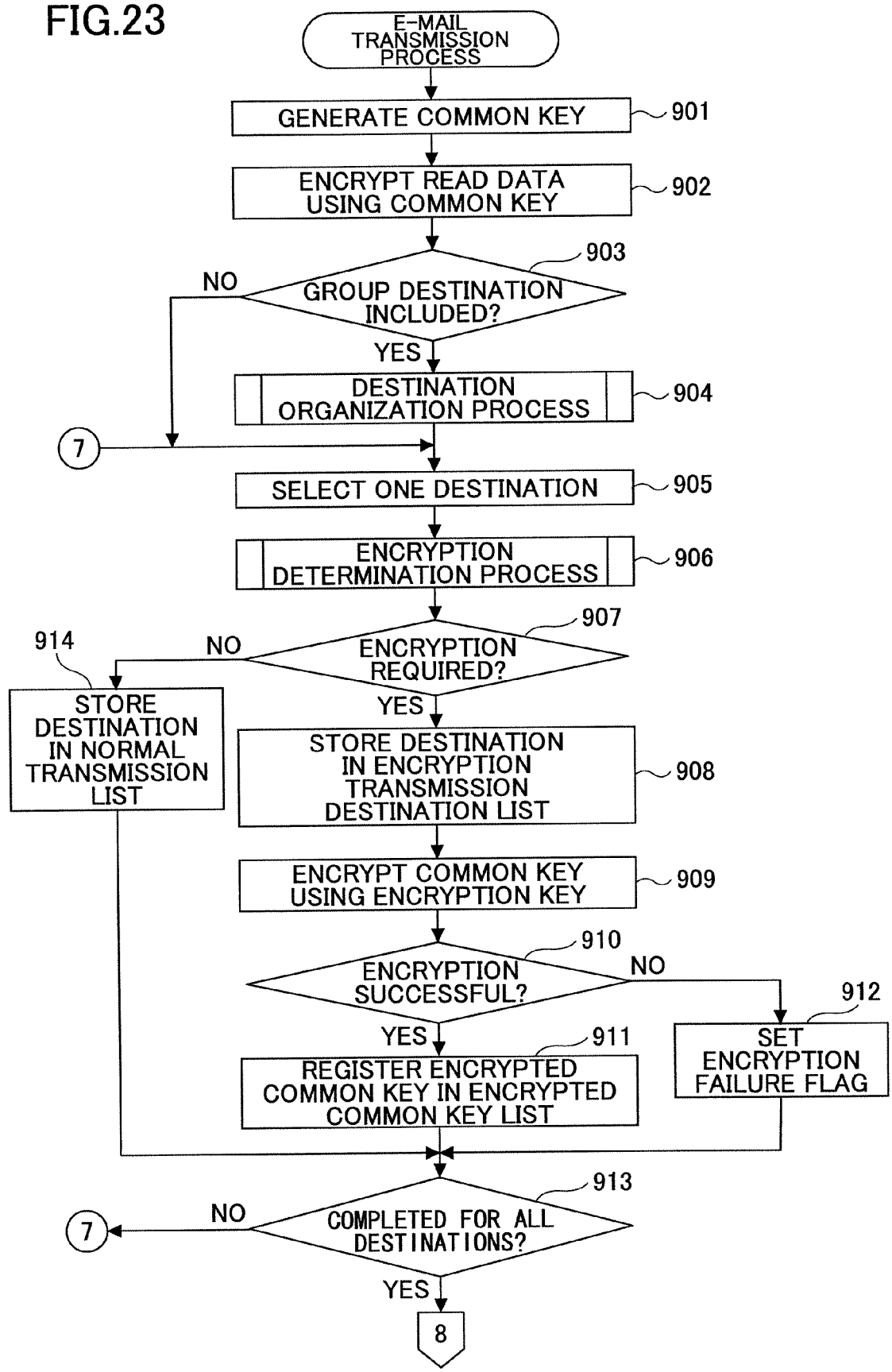
FIG. 23 is a flowchart illustrating process steps of an e-mail transmission process according to another example.
Figure 24:
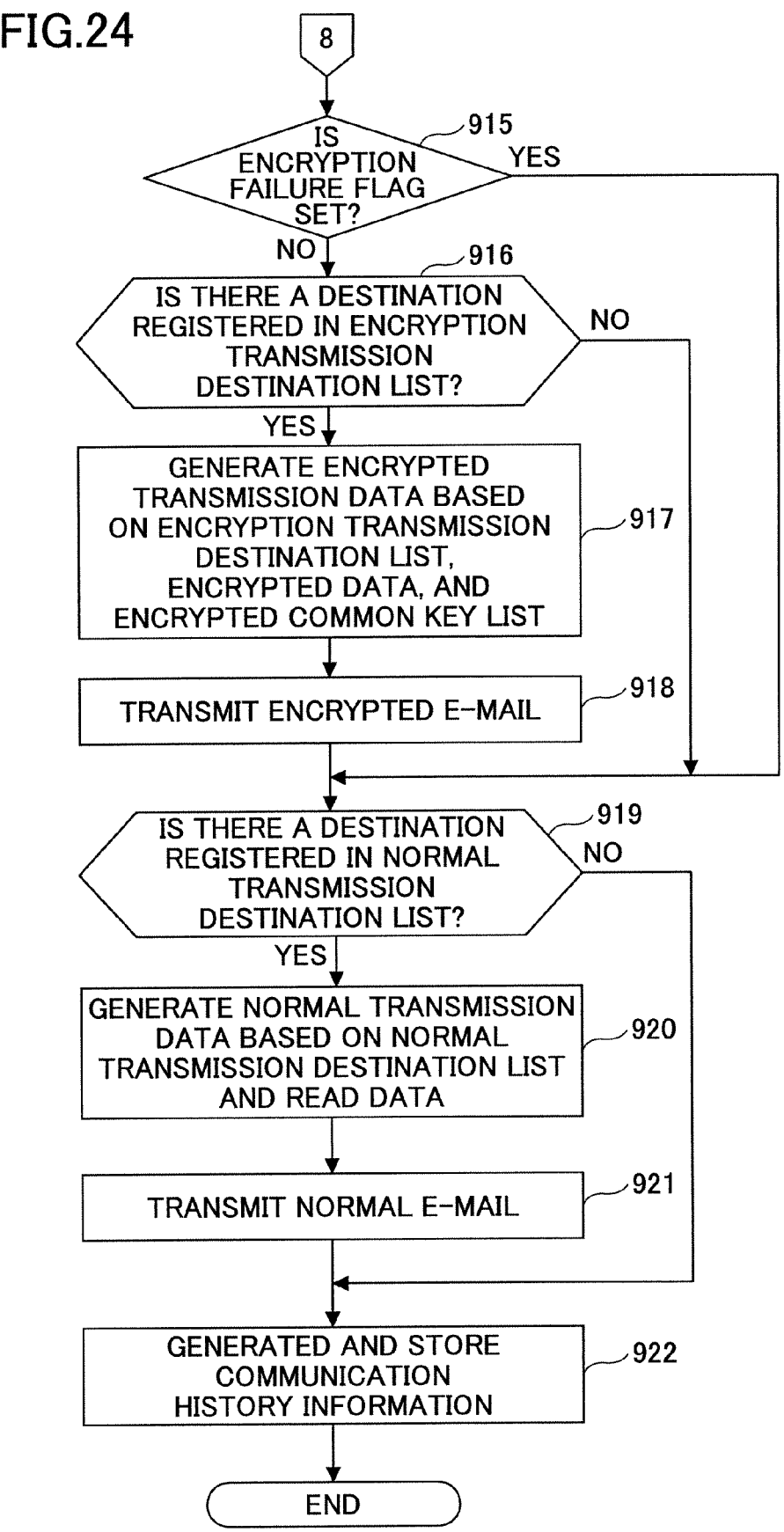
FIG. 24 is a flowchart illustrating process steps of the e-mail transmission process continued from FIG. 23.

FIGS. 23 and 24 are flowcharts illustrating another exemplary sequence of process steps for performing an e-mail transmission job.

According to this example, a common key used for encryption communication is generated (step 901), read data corresponding to a transmission message is encrypted according to a predetermined encryption scheme using the common key generated in step 901, and the encrypted data are stored in the magnetic disk unit 9 (step 902).

Then, a determination is made as to whether the destinations designated by the user include a group destination (step 903), and if a positive determination (YES) is made, a destination organization process is performed for acquiring the e-mail destinations registered in the group destination (step 904). By performing the destination organization process of step 904, the e-mail destinations to which the present e-mail transmission process is directed may be organized. For example, when overlapping destination designations are detected as a result of designating a single e-mail destination when this single destination actually belongs to a designated group destination, one of the overlapping designations may be retained and the rest of the designations may be canceled.

On the other hand, when a negative determination (NO) is made in step 903, the destination organization process of step 904 is not performed.

Then, one e-mail destination is selected from the designated destinations (step 905), and an encryption determination process is performed for determining whether encryption communication is to be implemented for the selected e-mail destination (step 906).

In the case where it is determined by the encryption determination process that encryption communication is to be performed for the selected e-mail destination (step 907, YES), the selected e-mail destination is stored in an encryption transmission destination list (step 908), the common key generated in step 901 is encrypted using the public key A stored in association with the selected e-mail destination (step 909).

Then, a determination is made as to whether encryption has been properly performed on the common key (step 910), and when a positive determination (YES) is made, the encrypted common key generated in step 909 is registered in an encrypted common key list (step 911). When a negative determination (NO) is made in step 910, an encryption failure flag is set (step 912). It is noted that the encryption failure flag may be reset at the initial point of performing an e-mail transmission process.

Then, a determination is made as to whether the encryption determination process has been performed on all the designated destinations (step 913), and if a negative determination (NO) is made in step 913, the process goes back to step 905 so that a next e-mail destination may be selected and the encryption determination process may be performed thereon.

In a case where the encryption determination process determines that encryption communication is not required for the selected e-mail destination so that a negative determination (NO) is made in step 907, the selected e-mail destination is stored in a normal transmission destination list (step 914) after which the process moves on to step 913.

When the encryption determination process is performed on all the designated e-mail destinations so that a positive determination (YES) is made in step 913, a determination is made as to whether one or more encryption failure flags are set (step 915). When encryption of the common key is successfully performed for all the relevant destinations so that a negative determination (NO) is made in step 915, a determination is made as to whether one or more destinations are registered in the encryption transmission destination list (step 916).

In a case where a positive determination (YES) is made in step 916, encrypted transmission data are generated based on the encryption transmission destination list, the encrypted data, and the encrypted common key list (step 917), and e-mail containing the encrypted transmission data generated in step 917 (encrypted e-mail) are transmitted to the relevant e-mail destinations (step 918). On the other hand, when a negative determination (NO) is made in step 916, steps 917 and 918 are not performed.

Then, a determination is made as to whether at least one e-mail destination is registered in the normal transmission destination list (step 919). If a positive determination (YES) is made in step 919, normal transmission data are generated based on the normal transmission destination list and the read data (step 920), and e-mail containing the normal transmission data generated in step 920 are transmitted to the relevant e-mail destinations (step 921). On the other hand, when a negative determination (NO) is made in step 919, steps 920 and 921 are not performed.

Then, transmission history information pertaining to the present e-mail transmission operations is generated and stored (step 922) after which the relevant e-mail transmission process is ended.

In a case where one or more encryption failure flags are set so that a positive determination (YES) is made in step 915, the process moves on to step 919. That is, encryption communication operations are not performed in this case.

As can be appreciated, according to the present example, when an encryption process (public key encryption process) performed on at least one destination ends in failure, encryption communication operations of the relevant transmission job are not performed, and only normal communication operations are performed. In this way, the burden imposed on the user may be reduced.

Figure 25:
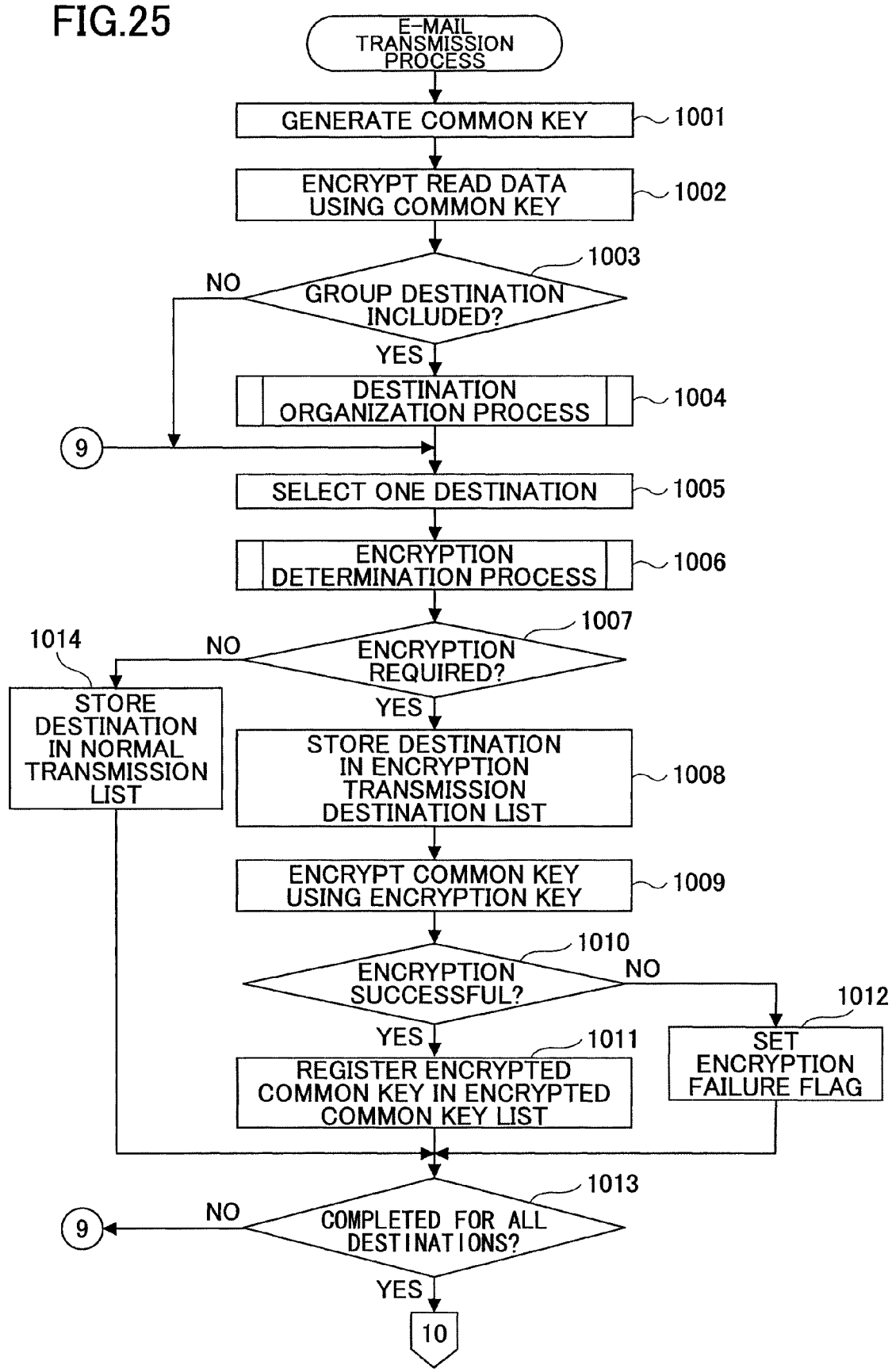
FIG. 25 is a flowchart illustrating process steps of an e-mail transmission process according to another example.
Figure 26:
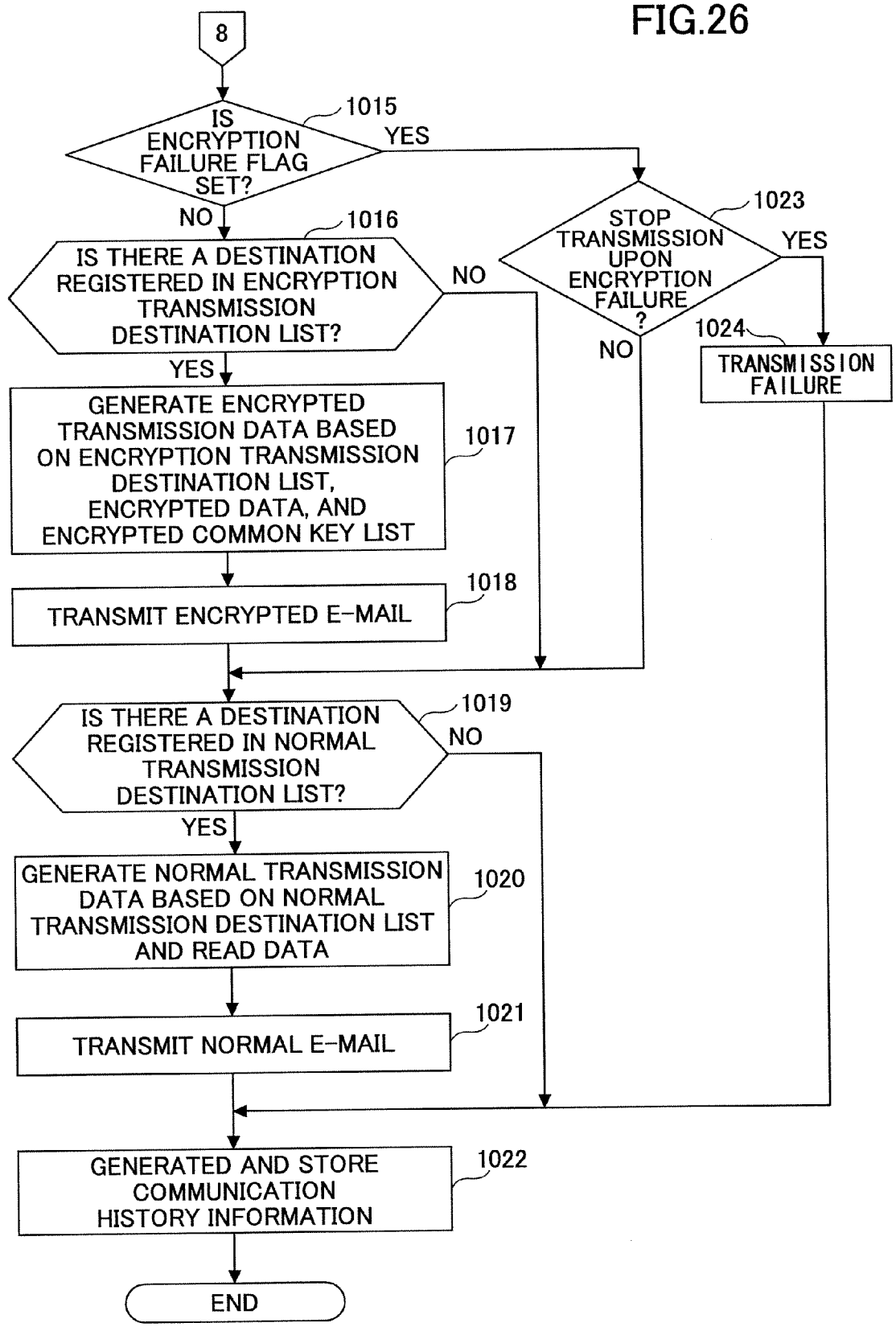
FIG. 26 is a flowchart illustrating process steps of the e-mail transmission process continued from FIG. 25.

FIGS. 25 and 26 are flowcharts illustrating another exemplary sequence of process steps for performing an e-mail transmission job.

According to this example, a common key used for encryption communication is generated (step 1001), read data corresponding to a transmission message is encrypted according to a predetermined encryption scheme using the common key generated in step 1001, and the encrypted data are stored in the magnetic disk unit 9 (step 1002).

Then, a determination is made as to whether the destinations designated by the user include a group destination (step 1003), and if a positive determination (YES) is made, a destination organization process is performed for acquiring the e-mail destinations registered in the group destination (step 1004). By performing the destination organization process of step 1004, the e-mail destinations to which the present e-mail transmission process is directed may be organized. For example, when overlapping destination designations are detected as a result of designating a single e-mail destination when this single destination actually belongs to a designated group destination, one of the overlapping designations may be retained and the rest of the designations may be canceled. On the other hand, when a negative determination (NO) is made in step 1003, the destination organization process of step 1004 is not performed.

Then, one e-mail destination is selected from the designated destinations (step 1005), and an encryption determination process is performed for determining whether encryption communication is to be implemented for the selected e-mail destination (step 1006).

In the case where it is determined by the encryption determination process that encryption communication is to be implemented for the selected e-mail destination (step 1007, YES), the selected e-mail destination is stored in an encryption transmission destination list (step 1008), the common key generated in step 1001 is encrypted using the public key A stored in association with the selected e-mail destination (step 1009).

Then, a determination is made as to whether encryption has been properly performed on the common key (step 1010), and when a positive determination (YES) is made, the encrypted common key generated in step 1009 is registered in an encrypted common key list (step 1011). When a negative determination (NO) is made in step 1010, an encryption failure flag is set (step 1012). It is noted that the encryption failure flag may be reset at the initial point of performing an e-mail transmission process.

Then, a determination is made as to whether the encryption determination process has been performed on all the designated destinations (step 1013), and if a negative determination (NO) is made in step 1013, the process goes back to step 1005 so that a next e-mail destination may be selected and the encryption determination process may be performed thereon.

In a case where the encryption determination process determined that encryption communication is not required for the selected e-mail destination so that a negative determination (NO) is made in step 1007, the selected e-mail destination is stored in a normal transmission destination list (step 1014) after which the process moves on to step 1013.

When the encryption determination process is performed on all the designated e-mail destinations so that a positive determination (YES) is made in step 1013, a determination is made as to whether one or more encryption failure flags are set (step 1015). When encryption of the common key is successfully performed for all the relevant destinations so that a negative determination (NO) is made in step 1015, a determination is made as to whether one or more destinations are registered in the encryption transmission destination list (step 1016).

In a case where a positive determination (YES) is made in step 1016, encrypted transmission data are generated based on the encryption transmission destination list, the encrypted data, and the encrypted common key list (step 1017), and an e-mail containing the encrypted transmission data generated in step 1017 (encrypted e-mail) are transmitted to the relevant e-mail destinations (step 1018). On the other hand, when a negative determination (NO) is made in step 1016, steps 1017 and 1018 are not performed.

Then, a determination is made as to whether at least one e-mail destination is registered in the normal transmission destination list (step 1019). If a positive determination (YES) is made in step 1019, normal transmission data are generated based on the normal transmission destination list and the read data (step 1020), and e-mail containing the normal transmission data generated in step 1020 are transmitted to the relevant e-mail destinations (step 1021). On the other hand, when a negative determination (NO) is made in step 1019, steps 1020 and 1021 are not performed.

Then, transmission history information pertaining to the present e-mail transmission operations is generated and stored (step 1022) after which the relevant e-mail transmission process is ended.

In a case where one or more encryption failure flags are set so that a positive determination (YES) is made in step 1015, a determination is made as to whether the relevant transmission operations should be terminated based on user settings (step 1023). When a negative determination (NO) is made in step 1023, the process moves on to step 1019. That is, encryption communication operations of the present transmission job are not performed in this case.

In the case where a positive determination (YES) is made in step 1024, the process moves on to step 1022, and communication history information pertaining to the present e-mail transmission operations is generated and stored.

As can be appreciated, according to the present example, when a public key encryption process performed for at least one destination ends in failure, user settings may be referenced in order to determine whether to terminate all communication operations of the relevant transmission job or terminate only encryption communication operations while performing normal communication operations. In this way, communication operations may be controlled as is necessary or desired according to user settings.

According to another example, when a public key encryption process performed for a destination ends in failure, encryption transmission operations directed to this destination is not performed but encryption transmission operations and normal transmission operations directed to the other designated destinations are performed.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-022322 filed on Jan. 31, 2006, the entire contents of which are hereby incorporated by reference.

What is claimed is:

1. A communication apparatus that transmits data to a plurality of destinations, the communication apparatus comprising:
    a first input device that inputs an individual setting as to whether the data is encrypted for each of the plurality of destinations for an encryption transmission;
    a second input device that inputs an individual setting as to whether the data is encrypted for each transmission job; and
    transmission control circuitry that, when the transmission job includes at least two sets of the destinations, if the transmission job is set to be encrypted, performs the encryption transmission for each of the destinations, and, if the transmission job is set to be not encrypted, performs the encryption transmission for each of the destinations to be encrypted and performs a transmission without an encryption for each of the destinations not to be encrypted, wherein
    when the encryption transmission is set to be performed for at least one of the destinations and when the encryption fails, the transmission is not performed for any of the destinations.

2. The communication apparatus as claimed in claim 1, wherein the communication apparatus is configured to generate a common key and encrypt the data to be communicated by the common key, the common key encrypted by a public key provided by a recipient of the data, the communication apparatus configured to set an encryption failure flag when the common key has not been encrypted, and the encryption transmission are not conducted when the encryption failure flag has been set for at least one of the plurality of destinations.

3. The communication apparatus as claimed in claim 1, wherein, when the transmission job includes the at least two sets of the destinations and the transmissions are performed for the destinations in a plurality of transmission methods, the transmission control circuitry performs the encryption according to each of the plurality of transmission methods when the encryption transmission is set to be performed.

4. The communication apparatus as claimed in claim 1, further comprising:
    a warning display device that displays a warning that the plurality of destinations includes at least one destination for the encryption transmission and at least one destination for the transmission without the encryption, wherein, when a command to continue the transmission job is input in response to the warning, the encryption transmission is performed for the at least one destination to be encrypted, and a transmission is performed without the encryption for the at least one destination not to be encrypted.

5. A method for controlling a communication apparatus that transmits data using a plurality of transmission methods, the method comprising:

inputting an individual setting as to whether the data is encrypted for each of a plurality of destinations for an encryption transmission;

inputting an individual setting as to whether the data is encrypted for each transmission job; and, when at least two sets of the destinations are input for the transmission job, if the transmission job is set to be encrypted, performing the encryption transmission for each of the destinations, and, if the transmission job is set to be not encrypted, performing the encryption transmission for each of the destinations to be encrypted and performing a transmission without an encryption for each of the destinations not to be encrypted, wherein when the encryption transmission is set to be performed for at least one of the destinations and when the encryption fails, the transmission is not performed for any of the destinations.

6. The method as claimed in claim 5, further comprising:

when the transmission job includes the at least two sets of the destinations and when the transmissions are performed for the destinations in the plurality of transmission methods, performing the encryption according to each of the plurality of transmission methods when the encryption transmission is set to be performed.

7. The method as claimed in claim 5, further comprising: displaying a warning that the plurality of destinations includes at least one destination for the encryption transmission and at least one destination for the transmission without the encryption, wherein, when a command to continue the transmission job is input in response to the warning, the encryption transmission is performed for the at least one destination to be encrypted, and a transmission is performed without the encryption for the at least one destination not to be encrypted.

8. A non-transitory computer-readable storage medium encoded with a program that is run on a computer to function as a communication apparatus that transmits data, the program being executed by the computer to perform a method comprising:

inputting an individual setting as to whether the data is encrypted for each of a plurality of destinations for an encryption transmission;

inputting an individual setting as to whether the data is encrypted for each transmission job; and, when at least two sets of the destinations are input for the transmission job, if the transmission job is set to be encrypted, performing the encryption transmission for each of the destinations, and, if the transmission job is set to be not encrypted, performing the encryption transmission for each of the destinations to be encrypted and performing a transmission without an encryption for each of the destinations not to be encrypted, wherein when the encryption transmission is set to be performed for at least one of the destinations and when the encryption fails, the transmission is not performed for any of the destinations.

* * * * *